(12) United States Patent
Wigren et al.

(10) Patent No.: US 10,225,034 B2
(45) Date of Patent: Mar. 5, 2019

(54) METHOD, APPARATUS, AND SYSTEM FOR INTERFERENCE METRIC SIGNALLING

(71) Applicant: Telefonaktiebolaget L M Ericsson (publ), Stockholm (SE)

(72) Inventors: Torbjörn Wigren, Uppsala (SE); Stephen Craig, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 61 days.

(21) Appl. No.: 14/646,170

(22) PCT Filed: Sep. 16, 2013

(86) PCT No.: PCT/SE2013/051076
§ 371 (c)(1),
(2) Date: May 20, 2015

(87) PCT Pub. No.: WO2014/081371
PCT Pub. Date: May 30, 2014

(65) Prior Publication Data
US 2015/0318944 A1  Nov. 5, 2015

Related U.S. Application Data

(60) Provisional application No. 61/729,900, filed on Nov. 26, 2012.

(51) Int. Cl.
*H04J 11/00* (2006.01)
*H04W 24/08* (2009.01)
(Continued)

(52) U.S. Cl.
CPC .......... *H04J 11/005* (2013.01); *H04B 17/345* (2015.01); *H04B 17/382* (2015.01);
(Continued)

(58) Field of Classification Search
CPC .. H04B 17/345; H04B 17/382; H04B 17/327; H04W 28/0284; H04W 24/08;
(Continued)

(56) References Cited

U.S. PATENT DOCUMENTS

| 7,912,461 B2 | 3/2011 | Wigren |
| 2010/0208600 A1 | 8/2010 | Persson |

(Continued)

FOREIGN PATENT DOCUMENTS

| WO | WO 2011/071430 | 6/2011 |
| WO | WO 2011/136706 | 11/2011 |
| WO | 2012078095 A1 | 6/2012 |

OTHER PUBLICATIONS

"Discrete-time Stochastic Systems; Estimation and Control" by T. Soderstrom; Advanced Textbooks in Control and Signal Processing, 2002.

(Continued)

*Primary Examiner* — Steven H Nguyen
(74) *Attorney, Agent, or Firm* — Patent Portfolio Builders, PLLC

(57) ABSTRACT

Mobile broadband traffic has been exploding in wireless networks (300) resulting in an increase of interferences and reduced operator control. Networks (300) are also becoming more heterogeneous putting additional demand in interference management. There is currently no support for signalling of neighbor cell interference gleaned from soft and softer handover powers. Thus, there are no algorithms that accounts for and/or estimates interference impact factors between neighboring cells based on neighbor cell interference estimates gleaned from soft and softer handover power. To address these and other issues, techniques to accurately predict/estimate neighbor cell interferences that accurately accounts for own cell powers, soft handovers, softer handovers, neighbor cell interferences, and remaining neighbor (Continued)

cell interferences are presented. The described techniques estimate coupling effects of scheduling decisions in one cell to surrounding cells. In this way, interferences in the network (300) can be managed. To allow sharing of impact factors between network nodes (500), signalling techniques are also presented.

21 Claims, 20 Drawing Sheets

(51) Int. Cl.
| | |
|---|---|
| H04W 36/18 | (2009.01) |
| H04W 36/00 | (2009.01) |
| H04W 72/12 | (2009.01) |
| H04W 28/02 | (2009.01) |
| H04B 17/345 | (2015.01) |
| H04B 17/382 | (2015.01) |
| H04W 52/24 | (2009.01) |
| H04W 52/34 | (2009.01) |
| H04W 52/40 | (2009.01) |
| H04L 1/20 | (2006.01) |
| H04W 52/12 | (2009.01) |
| H04W 52/38 | (2009.01) |
| H04L 5/00 | (2006.01) |
| H04L 12/911 | (2013.01) |
| H04B 17/327 | (2015.01) |

(52) U.S. Cl.
CPC ....... *H04W 24/08* (2013.01); *H04W 28/0284* (2013.01); *H04W 28/0289* (2013.01); *H04W 36/0094* (2013.01); *H04W 36/18* (2013.01); *H04W 72/1231* (2013.01); *H04B 17/327* (2015.01); *H04L 1/20* (2013.01); *H04L 5/0073* (2013.01); *H04L 47/823* (2013.01); *H04W 52/12* (2013.01); *H04W 52/243* (2013.01); *H04W 52/244* (2013.01); *H04W 52/343* (2013.01); *H04W 52/346* (2013.01); *H04W 52/386* (2013.01); *H04W 52/40* (2013.01)

(58) Field of Classification Search
CPC ............. H04W 36/18; H04W 36/0094; H04W 72/1231; H04W 28/0289; H04W 52/243; H04W 52/346; H04W 52/40; H04W 52/12; H04W 52/244; H04W 52/343; H04W 52/386; H04J 11/005; H04L 1/20; H04L 47/823; H04L 5/0073
See application file for complete search history.

(56) References Cited

U.S. PATENT DOCUMENTS

| | | | |
|---|---|---|---|
| 2011/0014909 A1* | 1/2011 | Han | H04J 11/0093 455/423 |
| 2011/0235598 A1* | 9/2011 | Hilborn | H04W 52/143 370/329 |
| 2011/0237273 A1* | 9/2011 | Wigren | H04B 17/345 455/452.2 |
| 2012/0140657 A1 | 6/2012 | Wigren | |
| 2013/0242744 A1* | 9/2013 | Wigren | H04W 24/02 370/236 |

OTHER PUBLICATIONS

"Estimation of uplink WCDMA load in a single RBS" by Wigren et al., 2007.
"Recursive Noise Floor Estimation in WCDMA" by Torbjorn Wigren; IEEE Transactions on Vehicular Technology, vol. 59, No. 5, Jun. 2002.
"Soft Uplink Load Estimation in WCDMA" by Torbjorn Wigren; IEEE Transactions on Vehicular Technology, vol. 58, No. 2, Feb. 2009.
PCT Notification of Transmittal of the International Search Report and the Written Opinion of the International Searching authority, or the Declaration for International application No. PCT/SE2013/051076, dated Mar. 27, 2014.
Wigren, T., Low Complexity Kalman Filtering for Inter-Cell Interference and Power Based Load Estimation in the WCDMA Uplink, 2011.
Goodwin et al., Uplink Load Based Scheduling for CDMA by K. Lau, G.C.C 2013.
"WCDMA Uplink Load Estimation with Generalized Rake Receivers" by Wigren, Jun. 2012.
Liu, Z. et al. "SIR-Based call Admission Control for OSCDMA Admission Control for DS-CDMA Cellular Systems", IEEE Journal on Selected Areas in Communications, vol. 12, No. 4, May 1, 1994, XP000588840, pp. 638-644.
Dziong, Z. et al. "Adaptive Traffic Admission for Integrated Services in CDMA Wireless-Access Networks", IEEE Journal on Selected Areas in Communications, vol. 14, No. 9, Dec. 1, 1996, XP011054571, pp. 1737-1747.
Ahmed M. H. "Call admission control in wireless networks: A comprehensive survey", IEEE Communications Surveys & Tutorials, vol. 7, No. 1, Jan. 1, 2005, XP011290930, pp. 50-69.
EP office action in application No. 13856912.4 dated Oct. 12, 2016.
EP office action in application No. 13856912.4 dated Jun. 19, 2017.
Office Action in application No. 13856912.4 dated Apr. 3, 2018.

* cited by examiner

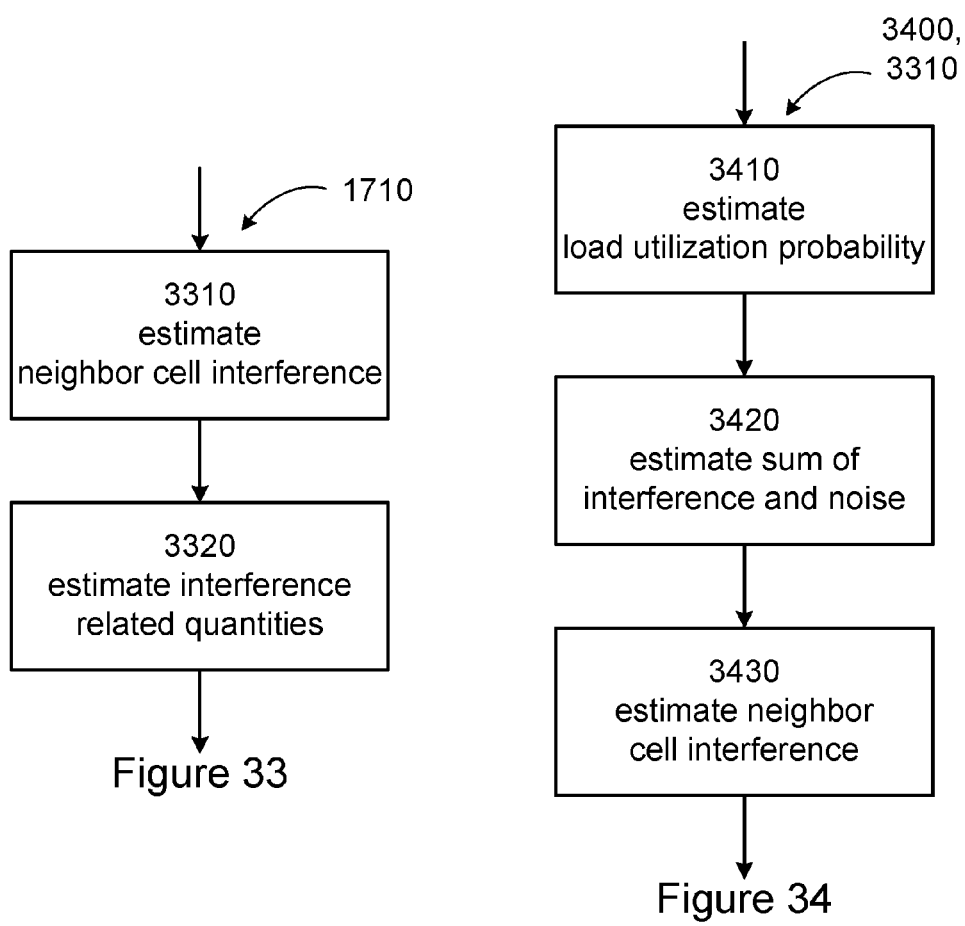

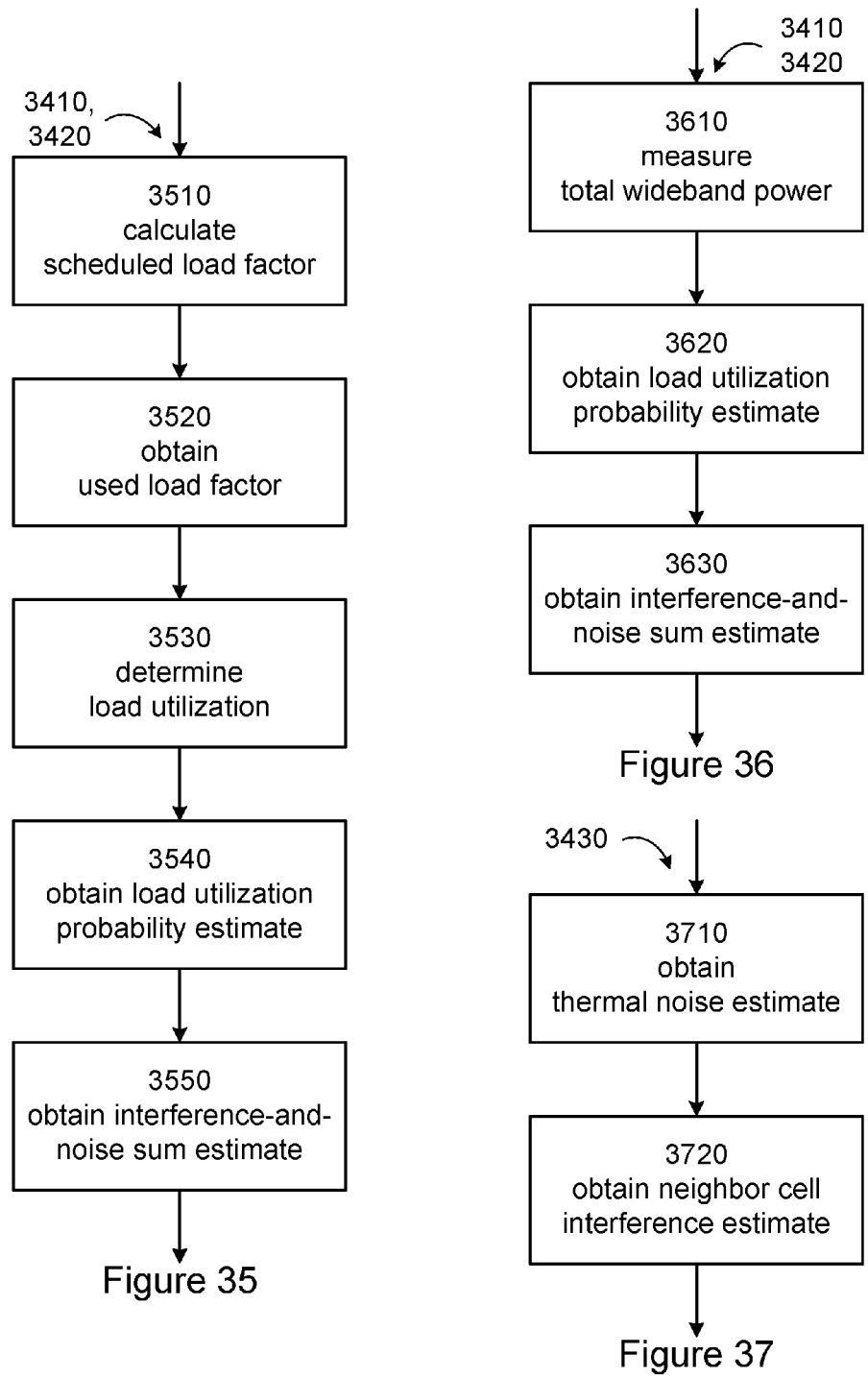

US 10,225,034 B2

METHOD, APPARATUS, AND SYSTEM FOR INTERFERENCE METRIC SIGNALLING

RELATED APPLICATION

This application claims priority and benefit of U.S. application 61/729,900 entitled "INTERFERENCE METRIC SIGNALLING FOR HETNETS" filed on Nov. 26, 2012, which is incorporated herein by reference in its entirety. This application may be related, at least in part, to U.S. application Ser. No. 13/488,187 entitled "OTHER CELL INTERFERENCE ESTIMATION" filed on Jun. 4, 2012; U.S. application Ser. No. 13/656,581 entitled "METHOD, APPARATUS, AND SYSTEM FOR INTERFERENCE AND NOISE ESTIMATION" filed on Oct. 19, 2012; U.S. application Ser. No. 13/776,328 entitled "GRANT UTILIZATION BASED OTHER CELL INTERFERENCE ESTIMATION" filed on Feb. 25, 2013; U.S. application Ser. No. 13/853,369 entitled "INTERFERENCE ESTIMATION WITH TDM" filed on Mar. 29, 2013, all of which are incorporated herein by reference in their entirety.

PRIORITY

This nonprovisional application is a U.S. National Stage Filing under 35 U.S.C. § 371 of International Patent Application Serial No. PCT/SE2013/051076 filed Sep. 16, 2013, and entitled "METHOD, APPARATUS, AND SYSTEM FOR INTERFERENCE METRIC SIGNALLING" which claims priority to U.S. Provisional Patent Application No. 61/729,900 filed Nov. 26, 2012, both of which are hereby incorporated by reference in their entirety.

TECHNICAL FIELD

The technical field of the present disclosure generally relates to wireless communication networks. In particular, the technical field relates to method(s), apparatus(es) and/or system(s) for interference metric signalling in wireless networks such as heterogeneous networks.

BACKGROUND

Recently, at least the following trends have emerged in the field of cellular telephony. First, mobile broadband traffic has been exploding in wireless networks such as WCDMA (wideband code division multiple access). The technical consequence is a corresponding steep increase of the interference in these networks, or equivalently, a steep increase of the load. This makes it important to exploit the load headroom that is left in the most efficient way.

Second, cellular networks are becoming more heterogeneous, with macro RBSs (radio base station) being supported by micro and pico RBSs at traffic hot spots. Furthermore, home base stations (e.g., femto RBSs) are emerging in many networks. This trend puts increasing demands on inter-cell interference management.

Third, the consequence of the above is a large increase of the number of network nodes in cellular networks, together with a reduced operator control. There is therefore a strong desire to introduce more self-organizing network (SON) functionality. Such functionality may support interference management by automatic interference threshold setting and adaptation, for a subset of the nodes of the cellular network.

To meet these new trends, high accuracy and high bandwidth load estimation becomes very important. Here, the high bandwidth, highly accurate estimation of the neighbor cell interference is troublesome, particularly in WCDMA networks. The neighbor cell interference in this context is the interference experienced at an own cell due to activities of cells other than the own cell. Thus, the neighbor cell interference may also be referred to as other cell interference.

Regarding the first trend, there does not yet exist a practical neighbor cell interference estimation algorithm that can, at the same time:
  Provide neighbor cell interference estimates with an inaccuracy better than 10-20%; and
  Does so with close to TTI (transmission time interval) bandwidth over interested power and load ranges.

As a result, it is difficult or even impossible to make optimal scheduling decisions since the exact origin of the interference power in the uplink (UL) is unknown. In WCDMA for example, the UEs (user equipments) may or may not utilize the power granted by the EUL (enhanced uplink) scheduler. This leads to an inaccuracy of the load prediction step, where the scheduler bases its scheduling decision on a prediction of the resulting air interface load of the traffic it schedules. This is so since the 3GPP standard has an inherent delay of about at least 5 TTIs from the scheduling decision until the interference power appears over the air interface. Also soft and softer handover powers are estimated separately. This can lead to additional inaccuracies in the load prediction and estimation steps.

Regarding the second trend, there is currently no accurate and high bandwidth neighbor cell interference estimates available at the RBS level, or above RBS level in the WCDMA RAN, particularly for estimates cleaned from soft and soft handover powers. It is therefore difficult or even impossible to manage interference in heterogeneous networks (HetNets) in an optimal way. This is logical since different actions are needed depending on the origin of the interference power. This is easily understood in overload situations, since then the correct cell needs to receive power down commands, e.g., in the form of reduced thresholds to resolve the situation.

Regarding the third trend, there is currently no support for signalling of neighbor cell interference cleaned from softer handover powers, e.g., between NodeB and RNC, between RNCs, or directly between RBSs. There are therefore currently no algorithms in WCDMA that can account for and/or estimate interference impact factors between neighboring cells based on neighbor cell interference estimates gleaned from softer handover power.

Load Estimation Without Neighbor Cell Interference Estimation

Following is a discussion on measurement and estimation techniques to measure instantaneous total load on the uplink air interface given in a cell of a WCDMA system. In general, a load at the antenna connector is given by noise rise, also referred to as rise over thermal, RoT(t), defined by:

$$RoT(t) = \frac{P_{RTWP}(t)}{P_N(t)}, \quad (1)$$

where $P_N(t)$ is the thermal noise level as measured at the antenna connector. For the purposes of discussion, $P_{RTWP}(t)$ may be viewed as the total wideband power defined by:

$$P_{RTWP}(t) = \sum_{i=1}^{I} P_k(t) + P_{neighbor}(t) + P_N(t), \quad (2)$$

also measured at the antenna connector. The total wideband power $P_{RTWP}(t)$ is unaffected by any de-spreading applied. In equation (2), $P_{neighbor}(t)$ represents the power received from one or more cells of the WCDMA system other than an own cell, i.e., from neighbor cells. The $P_i(t)$ is the power of the individual user i in the own cell. One major difficulty of any RoT estimation technique is the inability to separate the thermal noise $P_N(t)$ from the interference $P_{neighbor}(t)$ from neighbor cells.

Another problem is that the signal reference points are, by definition, at the antenna connectors. The measurements are however obtained after the analog signal conditioning chain in the digital receiver. The analog signal conditioning chain introduces a scale factor error of about 1 dB (1-sigma) for which it is difficult to compensate. Fortunately, all powers of in equation (2) are equally affected by the scale factor error so when equation (1) is calculated, the scale factor error is cancelled as follows:

$$RoT^{DigitalReceiver}(t) = \frac{P_{RTWP}^{DigitalReceiver}(t)}{P_N^{DigitalReceiver}(t)} = \frac{\gamma(t)P_{RTWP}^{Antenna}(t)}{\gamma(t)P_N^{Antenna}(t)} = RoT^{Antenna}(t). \quad (3)$$

To understand the problem of interferences from neighboring cells when performing load estimation, note that:

$$P_{neighbor}(t)+P_N(t)=E[P_{neighbor}(t)]+E[P_N(t)]+ \Delta P_{neighbor}(t)+\Delta P_N(t). \quad (4)$$

where E[ ] denotes a mathematical expectation and where Δ denotes a variation around the mean.

The problem can now be seen. Since there are no measurements available in the RBS that are related to the neighbor cell interference, a linear filtering operation can at best estimate the sum $E[P_{neighbor}(t)]+E[P_N(t)]$. This estimate cannot be used to deduce the value of $E[P_N(t)]$. The situation is the same as when the sum of two numbers is available. Then there is no way to determine the individual values of $E[P_{neighbor}(t)]$ and $E[P_N(t)]$. It has also been formally proved that the thermal noise power floor is not mathematically observable.

FIG. 1 illustrates a conventional algorithm that estimates a noise floor. The illustrated algorithm is referred to as a sliding window algorithm, and estimates the RoT as given by equation (1). The main problem solved by this conventional sliding window algorithm is that it can provide an accurate estimation of the thermal noise floor N(t). Since it is not possible to obtain exact estimates of this quantity due to the neighbor cell interference, the sliding window estimator therefore applies an approximation, by considering a soft minimum computed over a relative long window in time. Note that the sliding window estimator relies on the fact that the noise floor is constant over very long periods of time (disregarding small temperature drifts).

One significant disadvantage of the sliding window estimator is that the algorithm requires a large amount of memory. This becomes particularly troublesome in case a large number of instances of the algorithm is needed, as may be the case when the interference cancellation (IC) is introduced in the uplink.

A recursive algorithm has been introduced to reduce the memory consumption. Relative to the sliding window algorithm, the recursive algorithm can reduce the memory requirement by a factor of more than one hundred to a thousand.

Load Prediction Without Interference Power Estimation

Following is a discussion on techniques to predict instantaneous load on the uplink air interface ahead in time. The scheduler uses this functionality. The scheduler tests different combinations of grants to determine the best combinations, e.g., maximizing the throughput. This scheduling decision will only affect the air interface load after a number of TTIs (each such TTI being a predetermined time duration such as 2 or 10 ms for example), due to grant transmission latency and UE latency before the new grant takes effect over the air interface.

In a conventional SIR (signal-to-interference ratio) based method, the prediction of uplink load, for a tentative scheduled set of UEs and grants, is based on the power relation defined by:

$$P_{RTWP}(t) - P_N(t) = \sum_{i=1}^{N} L_i(t)P_{RTWP}(t) + P_{neighbor}(t) \quad (5)$$

where $L_i(t)$ is the load factor of the i-th UE of the own cell. As indicated, $P_{neighbor}(t)$ denotes the neighbor cell interference. The load factors of the own cell are computed as follows. First, note that:

$$(C/I)_i(t) = \frac{P_i(t)}{P_{RTWP}(t) - (1-\alpha)P_i} = \quad (6)$$

$$\frac{L_i(t)P_{RTWP}(t)}{P_{RTWP}(t) - (1-\alpha)L_i(t)P_{RTWP}(t)} = \frac{L_i(t)}{1-(1-\alpha)L_i(t)}$$

$$\Leftrightarrow$$

$$L_i(t) = \frac{(C/I)_i(t)}{1+(1-\alpha)(C/I)_i(t)},$$

$$i = 1, \ldots, I,$$

where I is the number of UEs in the own cell and α is the self-interference factor. The carrier-to-interference values, $(C/I)_i(t)$, i=1, ..., I, are then related to the SINR (measured on the DPCCH channel) as follows:

$$(C/I)_i(t) = \quad (7)$$

$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right),$$

$$i = 1, \ldots, I.$$

In equation (7), $W_i$ represents the spreading factor, RxLoss represents the missed receiver energy, G represents the diversity gain and the β's represent the beta factors of the respective channels. Here, inactive channels are assumed to have zero data beta factors.

The UL load prediction then computes the uplink load of the own cell by a calculation of equations (6) and (7) for each UE of the own cell, followed by a summation:

$$L_{own}(t) = \sum_{i=1}^{I} L_i(t), \quad (8)$$

which transforms equation (5) to:

$$P_{RTWP}(t)=L_{own}(t)P_{RTWP}(t)+P_{neighbor}(t)+P_N(t) \quad (9)$$

Dividing equation (9) by $P_N(t)$ shows that the RoT can be predicted k TTIs ahead as:

$$RoT(t+kT) = \frac{P_{neighbor}(t)/P_N(t)}{1-L_{own}(t)} + \frac{1}{1-L_{own}(t)} \quad (10)$$

In the SIR based load factor calculation, the load factor $L_i(t)$ is defined by equation (6). However, in a power based load factor calculation, the load factor $L_i(t)$ can be defined by:

$$L_i(t) = \frac{P_i(t)}{P_{RTWP}(t)}, \quad (11)$$

$$i = 1, \ldots, I,$$

and equations (8)-(10) may be calculated based on the load factor $L_i(t)$ of equation (11) to predict the RoT k TTIs ahead. An advantage of the power based load factor calculation is that the parameter dependence is reduced. On the downside, a measurement of the UE power is needed. But in certain circumstances, the power based load factor calculation may be preferred.

Heterogeneous Networks

In heterogeneous networks (HetNets), different kinds of cells are mixed. A problem that arises in HetNets in that the cells are likely to have different radio properties in terms of (among others):

radio sensitivity;
frequency band;
coverage;
output power;
capacity; and
acceptable load level.

This can be an effect of the use of different RBS sizes (macro, micro, pico, femto), different revisions (different receiver technology, SW quality), different vendors, the purpose of a specific deployment, and so on. An important factor in HetNets is that of the air interface load management, i.e., the issues associated with the scheduling of radio resources in different cells and the interaction between cells in terms of inter-cell interference.

These issues are exemplified with reference to FIG. 2 which illustrates a low power cell with limited coverage intended to serve a hotspot. To enable sufficient coverage of the hot spot, an interference suppressing receiver like the G-rake+ is used. One problem is now that the low power cell is located in the interior of and at the boundary of a specific macro cell. Also, surrounding macro cells interfere with the low power cell rendering a high level of neighbor cell interference in the low power cell which, despite the advanced receiver, reduces the coverage to levels that do not allow coverage of the hot spot. As a result, UEs of the hot spot are connected to the surrounding macro cells, which can further increase the neighbor cell interference experienced by the low power cell.

SUMMARY

A non-limiting aspect of the disclosed subject matter is directed to a method performed at a first network node corresponding to a cell of interest in a wireless network. The method may include obtaining a neighbor cell interference estimate $\hat{P}_{neighbor}(t)$ based on one or both of a measured load $\overline{L}_{own}(t)$ and total wideband power $P_{RTWP}(t)$. The neighbor cell interference estimate $\hat{P}_{neighbor}(t)$ may represent an estimate of a neighbor cell interference $P_{neighbor}(t)$ which expresses a sum of interferences present in the cell of interest due to wireless activities applicable at time t in one or more cells other than in the cell of interest. The measured load $\overline{L}_{own}(t)$ may represent resource grants used at the time t by one or more terminals in the cell of interest, and the total wideband power wideband power $P_{RTWP}(t)$ may represent a total power received in the cell of interest at the time t. The step may also include obtaining one or more of a soft interference estimate $\hat{P}_{soft}(t)$, a softer interference estimate $\hat{P}_{softer}(t)$ and a remaining neighbor interference estimate $\hat{P}_{neighborRemaining}(t)$ based on the neighbor cell interference estimate $\hat{P}_{neighbor}(t)$. The soft interference estimate $\hat{P}_{soft}(t)$ may represents an estimate of a soft interference $P_{soft}(t)$ which expresses a sum of interferences present in the cell of interest due to soft handovers applicable at the time t of one or more terminals into or out of the cell of interest. The softer interference estimate $\hat{P}_{softer}(t)$ may represent an estimate of a softer interference $P_{softer}(t)$ which expresses a sum of interferences present in the cell of interest due to softer handovers applicable at the time t of one or more terminals into or out of the cell of interest. The remaining neighbor interference estimate $\hat{P}_{neighborRemaining}(t)$ may represent an estimate of a remaining neighbor interference $\hat{P}_{neighborRemaining}(t)$ which expresses a sum of interferences present in the cell of interest due to wireless activities applicable at the time t in one or more cells other than in the cell of interest, and other than the soft and softer interferences $P_{soft}(t)$, $P_{softer}(t)$. The method may further include providing one or more interference-related quantities to a second network node over an interface. The interference-related quantities may comprise the soft interference estimate $\hat{P}_{soft}(t)$, the softer interference estimate $\hat{P}_{softer}(t)$, the remaining neighbor interference estimate $\hat{P}_{neighborRemaining}(t)$, and the neighbor cell interference estimate $\hat{P}_{neighbor}(t)$.

Another non-limiting aspect of the disclosed subject matter is directed to a computer readable medium carrying programming instructions such that when a computer executes the programming instructions, the computer performs the method performed by a first network node as described above.

Another non-limiting aspect of the disclosed subject matter is directed to a first network node corresponding to a cell of interest in a wireless network. The first network node may include an interference manager and a communicator. The interference manager may be structured to obtain a neighbor cell interference estimate $\hat{P}_{neighbor}(t)$ based on one or both of a measured load $\overline{L}_{own}(t)$ and total wideband power $P_{RTWP}(t)$. The interference manager may also be structured to obtain one or more of a soft interference estimate $\hat{P}_{soft}(t)$, a softer interference estimate $\hat{P}_{softer}(t)$, and a remaining neighbor interference estimate $\hat{P}_{neighborRemaining}(t)$ based on the neighbor cell interference estimate $\hat{P}_{neighbor}(t)$. The communicator may be structured to provide one or more interference-related quantities to a second network node over an interface.

Another non-limiting aspect of the disclosed subject matter is directed to a method performed at a second network node of a wireless network. The method may include obtaining one or more interference related quantities from one or more first network nodes. For each first network node, the interference related quantities may comprise any one or more of a neighbor cell interference estimate $\hat{P}_{neighbor}(t)$, a soft interference estimate $\hat{P}_{soft}(t)$, a softer interference estimate $\hat{P}_{softer}(t)$ and a remaining neighbor interference estimate $\hat{P}_{neighborRemaining}(t)$. The method may also include determining one or more interference impact factors based on the interference related quantities received from the first network nodes. The impact factors may represent factors that couple scheduling decisions taken in one cell with interferences experienced in one or more neighbor cells.

Another non-limiting aspect of the disclosed subject matter is directed to a computer readable medium carrying programming instructions such that when a computer executes the programming instructions, the computer performs the method performed by a second network node as described above.

Another non-limiting aspect of the disclosed subject matter is directed to a second network node of a wireless network. The second network node may include a communicator and an interference manager. The communicator may be structured to obtain one or more interference related quantities from one or more first network nodes. The interference manager may be structured to determine one or more interference impact factors based on the interference related quantities received from the first network nodes.

Another non-limiting aspect of the disclosed subject matter is directed to a method performed at a radio resource management node of a wireless network. The method may include obtaining one or more impact factors from a network node over an interface. The impact factors may represent factors that couple scheduling decisions taken in one cell with interferences experienced in one or more neighbor cells. For a cell i of the wireless network, the impact factors of the cell i may comprise at least one of soft impact factors, softer impact factors, and remaining neighbor cell interference impact factors. The soft impact factors may couple contributions to the interference experienced at the neighbor cells due to soft handovers of terminals into or out of the cell i. The softer impact factors may couple contributions to the interference experienced at the neighbor cells due to softer handovers of terminals into or out of the cell i. The remaining neighbor cell interference impact factors may couple contributions to the interference experienced at the neighbor cells due to activities of terminals in the cell i not in soft or softer handovers. The method may also include performing a radio resource management function based on the impact factors.

Another non-limiting aspect of the disclosed subject matter is directed to a computer readable medium carrying programming instructions such that when a computer executes the programming instructions, the computer performs the method performed by a radio resource management node as described above.

Another non-limiting aspect of the disclosed subject matter is directed to a radio resource management node of a wireless network. The radio resource management node may comprise a communicator and a resource manager. The communicator may be structured to obtain one or more impact factors from a network node over an interface. The resource manager may be structured to perform a radio resource management function based at least on the impact factors.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIG. 33 illustrates a flow chart of a process performed by a network node to estimate interference related quantities;

FIG. 34 illustrates a flow chart of a process performed by a network node to estimate neighbor cell interference;

FIGS. 35 and 36 illustrate flow charts of processes performed by a network node to estimate load utilization probabilities and sum of interference and noise;

FIG. 37 illustrates a flow chart of a process performed by a network node to estimate neighbor cell interference.

DETAILED DESCRIPTION

Figure 1:
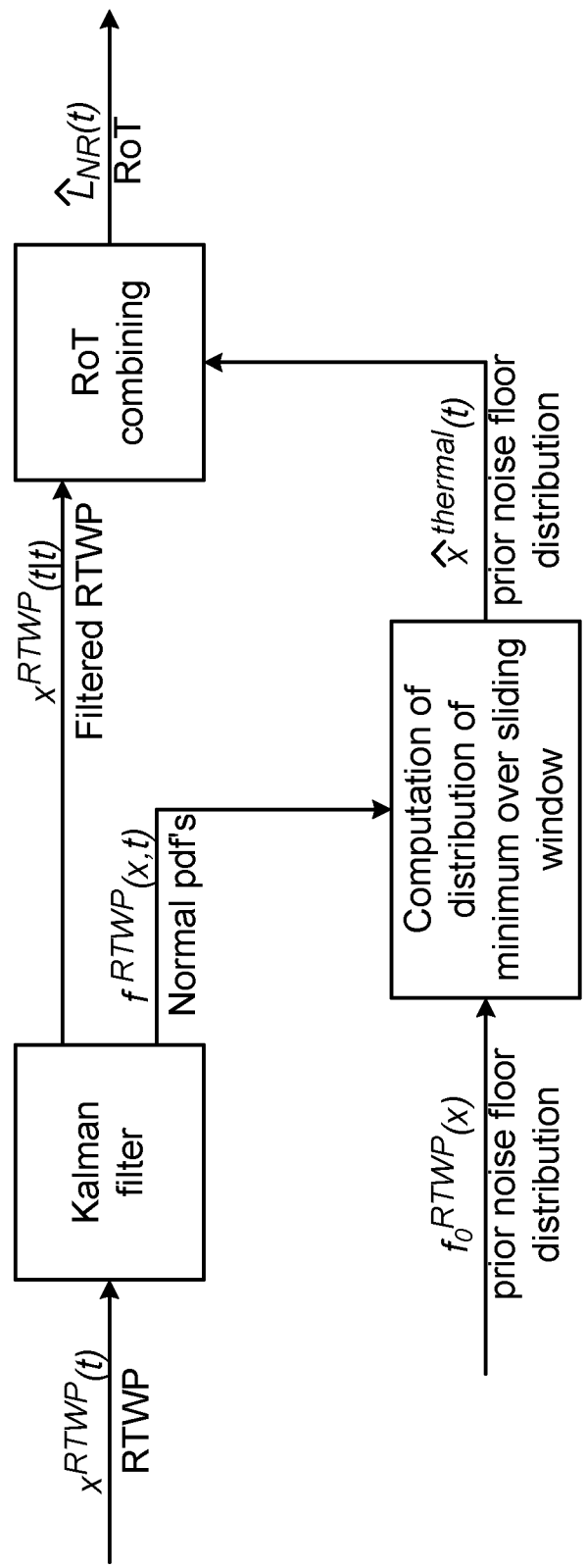
FIG. 1 illustrates a conventional algorithm that estimates a noise floor.
Figure 2:
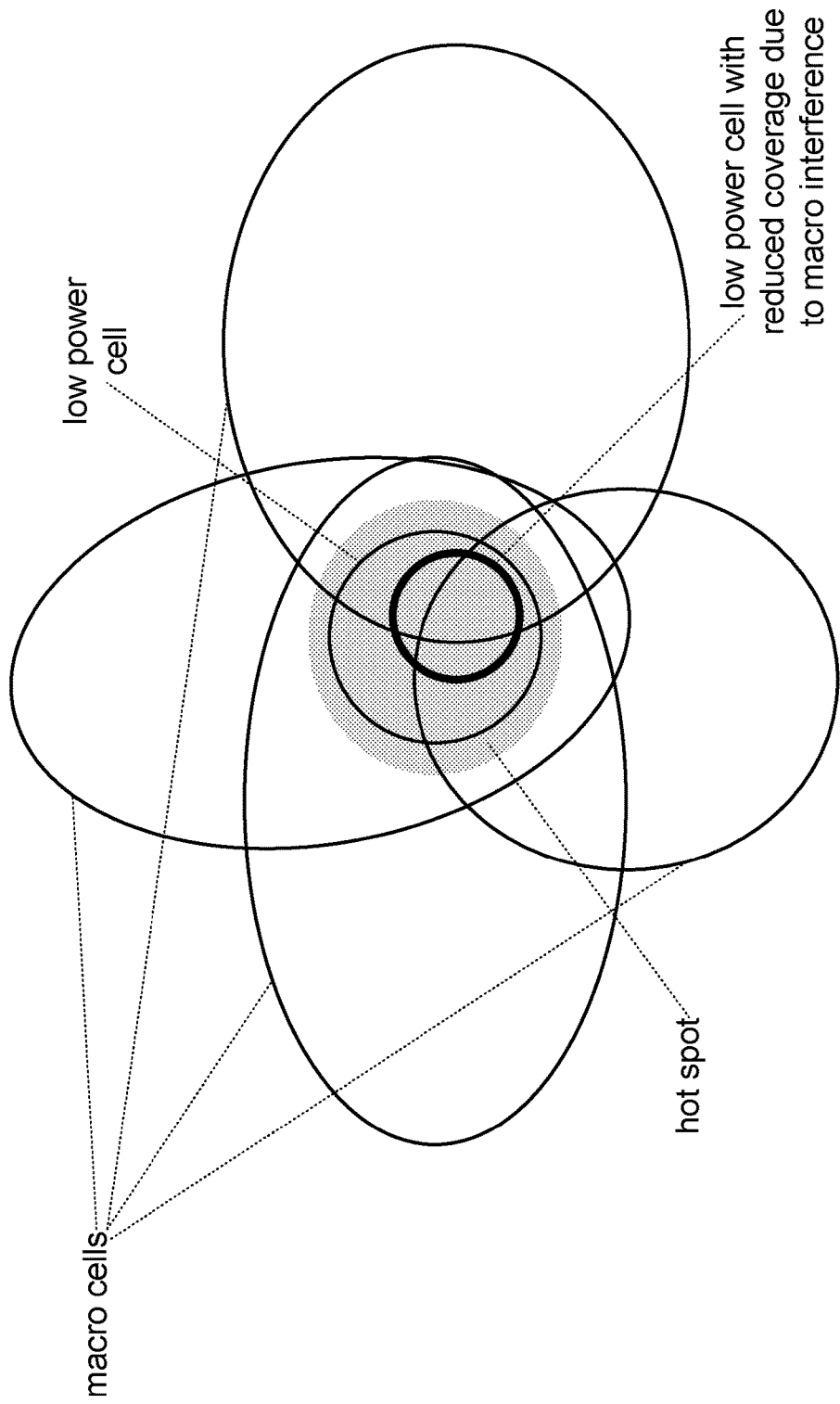
FIG. 2 illustrates an example scenario of a low power cell with limited coverage intended to serve a hotspot.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, LTE—are used as examples for explanation purposes. Note that the technology described herein can be applied to non-3GPP standards, e.g., WiMAX, cdma2000, 1xEVDO, as well as to any future cellular standard employing any kind of code division multiple access (CDMA) access. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a radio network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

From this discussion thus far, it is clear that it would be advantageous if the RNC (radio network controller) or the surrounding RBSs could be informed of the interference situation and take action, using e.g., admission control in the RNC or new functionality in the surrounding RBSs to reduce neighbor cell interference. For HetNets in particular, being informed of the interference situation would allow the RNC or the RBSs to provide a better management of the hot spot traffic—in terms of air interface load. But regardless of the network architecture, whether HetNet or not, the network nodes, e.g., the RBSs, should have the capability to accurately estimate the neighbor cell interference.

In HetNets, an important factor is that of air interface load management, i.e., issues associated with the scheduling of radio resources in different cells and the interaction between cells in terms of inter-cell interference. Of particular interest are the algorithmic architectures associated with such air-interface load management, for example, in the UL of the WCDMA system. The reasons for the interest include the need optimize performance in HetNets, and that the concept of load can change with the introduction of G-rake+, or other interference suppression or interference cancelling receiver types.

But regardless of the network architecture, whether HetNet or not, the network nodes, e.g., the RBSs, should have the capability to accurately estimate the neighbor cell interference. This requires a careful consideration of the algorithmic architectures involved.

As noted, there does not yet exist a practical neighbor cell interference estimation algorithm that can, at the same time:
  Provide neighbor cell interference estimates with an accuracy better than 10-20%; and
  Does so with close to TTI (transmission time interval) bandwidth over interested power and load ranges.

As indicated above, one major disadvantage of many conventional RoT(t) estimation techniques is in the difficulty of separating the thermal noise $P_N(t)$ from the interference $P_{neighbor}(t)$ from neighbor cells. This makes it difficult to estimate the RoT(t), i.e., difficult to estimate the load as given in equation (1). The neighbor cell interference $P_{neighbor}(t)$ in this context may be viewed as a sum of interferences present in a cell of interest due to wireless activities applicable at time t in one or more cells other than in the cell of interest. In one or more aspects, the determination of the neighbor cell interference $P_{neighbor}(t)$ involves estimating the neighbor cell interference. For the purposes of this disclosure, estimations of parameters are indicated with a "^" (caret) character. For example, $\hat{P}_{neighbor}(t)$ may be read as an estimate of the neighbor cell interference $P_{neighbor}(t)$.

There are known techniques to determine the neighbor cell interference estimate $\hat{P}_{neighbor}(t)$. These conventional techniques assume that the powers of all radio links are measured in the uplink receiver. This assumption is not true in many instances today. The power measurement is associated with difficulties since:
  In WCDMA for example, the uplink transmission is not necessarily orthogonal, which can cause errors when the powers are estimated.
  The individual code powers are often small, making the SNRs (signal-to noise ratio) low as well. This further contributes to the inaccuracy of the power estimates.

One major problem associated with the conventional neighbor cell interference estimation techniques is that the sum of neighbor cell interference and thermal noise $P_{neighbor}(t)+P_N(t)$ (referred to as interference-and-noise sum) needs to be estimated through high order Kalman filtering. The primary reason is that all powers of the UEs need to be separately filtered using at least one Kalman filter state per UE when such techniques are used. This step therefore is associated with a very high computational complexity. There are techniques that can reduce this computational complexity, but the complexity can be still too high when the number of UEs increases. In these conventional solutions, the thermal noise floor N(t) is estimated as described above, i.e., $\hat{N}(t)$ is determined followed by a subtraction to arrive at the neighbor cell interference estimate $\hat{P}_{neighbor}(t)$.

WCDMA is an example of a system that supports soft and softer handovers. In both, a wireless terminal, e.g., a UE, is simultaneously connected and synchronized to multiple cells in a network. Softer handover may be viewed as a special case of the soft handover in which the UE is simultaneously connected and synchronized to multiple cells of a single RBS. Softer handover provides extra signal power and provides a soft transition between cells when the UE migrates over the cell boundary region. Since the cells are in the same RBS, softer combining of powers between cells can be used which may give a substantial performance boost.

When the cells are not in the same RBS, softer combining cannot be used. Instead, conventional techniques typically signal the received information to the RNC which chooses the most beneficial RBS to represent the received signal from the UE.

For a cell, a scheduling decision and an associated interference will impact other neighboring cells. It would be desirable if the scheduler had the capability to predict this impact. This should not be confused with estimating neighbor cell interference experienced in a certain cell.

It can be noted that there are more impact factors than neighbor cell interference estimates available at a RBS at a certain point in time. The impact factors may also be referred to as "coupling" factors. This implies that in order to compute estimates also of impact/coupling factors, some information should be provided to a node (e.g., RNC, RBS, etc.) to compute these factors. Such information may include:

- an estimate of the experienced neighbor cell interference power in a specific cell, for a sequence of time instances; and
- estimates of the own cell interference estimated in surrounding cells and/or RBSs (i.e., interference transmitted from surrounding cells), for the same sequence of time instances.

But since the concepts of soft and/or softer handovers do not exist in LTE, conventional algorithms do not account for these types of impact factors. Any algorithm for neighbor cell interference estimation is also fundamentally different in LTE. The estimation techniques disclosed below may be more advanced than in LTE.

Conventionally, power control in WCDMA is performed cell by cell, and even user by user with little to no attention being paid to the effect on the neighbor cells. In principle, the power control function is built from two control loops, one outer and one inner. The inner loop is generally of less concern mainly because it is very fast. Therefore, the BW (bandwidth) of the disclosed quantities, algorithms and signalling may not be as beneficial for the inner loop power control.

However, the outer loop is significantly slower, and therefore may benefit significantly from the disclosed quantities, algorithms and signalling. The outer loop power control sets the target SIR (signal-to-interference ratio) to be achieved by the inner loop. The outer loop power control typically monitors the block error rate of the connection and increases or decreases the target SIR in response to the block error rate.

In conventional solutions, scheduling of traffic in WCDMA EUL is typically performed according to the water filling principle. This means that the EUL typically utilizes a scheduler that aims to fill the available load headroom of the air interface so that the different UE requests for bitrates are met. As stated above, the air-interface load in WCDMA is determined in terms of the noise rise over the thermal power level, i.e., the RoT(t). This illustrates why the load estimation (which can be done at the base station) is an important component.

Unfortunately, this basic setting only accounts for the experienced interference level in the own cell. In HetNet environments, it becomes important to take a more careful approach, avoiding interference impact to the largest possible extent on neighbor cells. This has at least two benefits. First it is likely to enhance the capacity of the WCDMA network significantly. Second, it would simplify management by reducing the cross coupling between cells.

Accounting for neighbor cell interference created by own scheduling decisions requires accurate knowledge of the coupling factors. As indicated above, the estimation of such coupling factors is not fully understood in the conventional techniques.

Admission control can provide a high level interference control in the RNC. For Release 99 (R99), it is the only way to provide interference control. The interface between the RBS and the RNC is prepared for signalling of basic interference information including the thermal noise power floor, the total wideband interference and the scheduled enhanced uplink interference. However, implementations for signalling of quantities needed for coupling factor estimation, or signalling of coupling factors have not yet been standardized.

Practical algorithms utilizing estimated high BW coupling factors are not known in as far as the inventor is aware. This is particularly true when a split into soft, softer and remaining neighbor cell interference can be made.

The congestion control mechanism parallels the admission control function in terms of signalling needs and lack of known solutions. However, it is noted that there are regulations performed by termination of connections.

RAB (radio access bearer) reconfiguration handles radio access bearer changes such as change of rates. Since rates are strongly correlated to interference generation, RAB reconfiguration in this respect could also be used for regulation of interference in scheduling. But like the admission control, the signalling needs are not standardized and no known solutions are available on the use of coupling factors since RAB reconfiguration is an RNC function.

Soft and softer handover are functions at the core of WCDMA. In a softer handover between cells of the same RBS, transmissions between the UE and each cell can be softly combined. In a soft handover between cells in different RBSs, a hard decision between the radio links of the different cells is made instead. The decision to initiate a soft or softer handover is typically governed by certain events that compare, e.g., estimated signal to interference ratios to thresholds. Signal processing tools such as hysteresis are used to avoid chattering. Similar events may be used to initiate a change of the serving cell in HSPA (high speed pack access) when required.

Further, cell planning is an activity where automation has been a desire for many years. With HetNets in particular, the need for automatic adaptation of cell plans is expected to grow enormously. It is seen that adaptation to achieve such SON (self-organizing network) functionality would benefit largely from availability of coupling factors. Again unfortunately, no such coupling factor estimation algorithms sensitive to the amount of soft(er) handover energy is known. Neither is there any signalling specified in 3GPP that supports such functionality.

One or more aspects of the disclosed subject matter may be directed to method(s), apparatus(es), and/or system(s) to implement an estimate a neighbor cell interference power. The method(s), apparatus(es), and/or system(s) may:

Estimate the neighbor cell interference experienced in a cell that accounts for the momentary utilization of the uplink load of a system (e.g., WCDMA system); and Provide separation of experienced neighbor cell interference into soft interference power, softer interference power and remaining neighbor cell interference power.

For example, the soft handover power, the softer handover power, neighbor cell interference power, and/or the remaining neighbor cell interference power may be estimated using measurements of the load utilization and the total wideband received uplink power. Such estimations may run in the RBS base band.

One or more aspects of the disclosed subject matter may be directed to method(s), apparatus(es), and/or system(s) to signal estimates related to interference powers (e.g., such as own cell power, soft handover power, softer handover power, neighbor cell interference power, and/or remaining neighbor cell interference power) among the network nodes. The signalling may be performed over standardized interfaces, (e.g., Iub, Iur) and/or over proprietary (e.g., Iubx) interfaces. Examples of network nodes include RBS, RNC, CN (core network) nodes, and IM (interference management) nodes (e.g., in HetNets). In this way, estimates of the experienced soft, softer, and/or remaining neighbor cell interference made for cells may be signalled:

With standardized signalling (e.g., 3GPP):
From RBS to RNC, over Iub.
From RBS to an interference management node in HetNets, said node being e.g. an RNC, an RBS or a core network node.
Between RNCs, over Iur,
From RNC to RBSs, over Iubs
From RNC to an interference management node in HetNets, said node being e.g. an RNC, an RBS or a core network node.

With proprietary signalling:
From RBS to RBSs, over a proprietary interface (Iubx).
From RBS to RNC, over a proprietary interface.
From RBS to an interference management node in HetNets, over a proprietary interface.
Between RNCs, over a proprietary interface.
From RNC to RBSs, over Iub, over a proprietary interface.
From RNC to an interference management node in HetNets.

One or more aspects of the disclosed subject matter may be directed to method(s), apparatus(es), and/or system(s) to estimate, and/or otherwise determine interference impact factors (also denoted as coupling factors). For example, a network node (e.g., RNC, RBS, CN node) may combine own cell power, soft handover power, softer handover power, neighbor cell interference power, and/or remaining neighbor cell interference power (any of which can be estimated in and signalled from multiple cells of the own and surrounding RBSs) to compute, determine, and/or estimate the interference impact factors from one specific cell of an RBS, onto a set of surrounding cells, some of which may be in surrounding RBSs. A third network node may make such estimations.

One or more aspects of the disclosed subject matter may be directed to method(s), apparatus(es), and/or system(s) to implement a scheduling strategy and/or algorithm based on the estimated impact factors. The scheduling strategy/algorithm may simultaneously account for any one or more of:

Own cell power(s);
Soft interference;
Softer interference;
Remaining neighbor cell interference;
Impact factors with respect to surrounding neighbor cells, some of which may be in surrounding RBSs.

One or more aspects of the disclosed subject matter may be directed to method(s), apparatus(es), and/or system(s) to implement a RRM (radio resource management) functionality and/or algorithm. The RRM function and/or algorithm may simultaneously account for the estimated interference impact factors with respect to the surrounding neighbor cells. The functionality/algorithm may include performing any one or more of:

Power control (e.g., central power control);
Admission control;
Congestion control;
Connection capability;
RAB reconfiguration;
Mobility management;
Self organizing network functionality, e.g., cell planning, using pilot signal settings to affect coverage.

Neighbor cell interference estimation can be addressed in various ways. In this disclosure, the neighbor cell interference estimation algorithms that are of particular interest have the following characterizing features each of which will be further explained in detail:

Process measurements of the received uplink total wideband power $P_{RTWP}(t)$;
Process measurements of the load utilization of the uplink;
Jointly estimate at least the neighbor cell interference power and the load utilization probability.

The $P_{RTWP}(t)$ measurement and the concepts of own and neighbor cell interference power have been explained above. Regarding the load utilization concept, note that in WCDMA EUL for example, the scheduler gives grants to UEs. These grants give the UEs the right to transmit with a certain rate and power, i.e., each grant only expresses a limit on the UL power the UE is allowed to use. However, UE does not have to use the grants; it may only use a portion of its grant.

This freedom of the UE creates large problems for the estimation of uplink load. The reason is that in practice, field trials reveal a load utilization that is sometimes less than 25%. Unless accounted for, the scheduler will believe that the load is then much higher than it actually is. The result of this is that the scheduler stops granting too early, resulting in under-utilization of the UL resources. Such waste is not acceptable.

In one or more aspects, it is proposed to mitigate the UL resource under-utilization by accounting for the measured utilization in the estimation of interference powers such as neighbor cell interference. For example, the estimated neighbor cell interference may be made dependent on an additional estimate of the load utilization, which can be treated as a probability. The estimate may be supported by measurement closely related to the estimated load utilization. In this way, the accuracy of the neighbor cell interference power estimate is boosted. A high rate of availability of these measurements (e.g., at TTI rate) together with the accuracy of the estimates, allow also for a very high bandwidth of the estimates (since they are accurate, less filtering is needed for smoothing and noise suppression which in turn enhances the bandwidth).

Example algorithms that may be used to estimate the neighbor cell interference include any one or more of:

Bayesian estimation;
Extended Kalman filtering (EKF);
Maximum likelihood estimation.

Recall from the discussion regarding HetNets that the surrounding macro cells can interfere with the low power cell to levels such that the UEs of the hotspot are actually connected to the macro cells. To address such issues, in one or more aspects of disclosed subject matter, RNC or the surrounding RBSs can be informed of the interference situation and can take action as appropriate. For example, admission control in the RNC or functionalities in the surrounding RBSs can be used to reduce the neighbor cell interference and provide better management of the hot spot traffic, e.g., in terms of air interface load. To enable this to take place, the RBS can include capabilities to estimate the neighbor cell interference.

Figure 3:
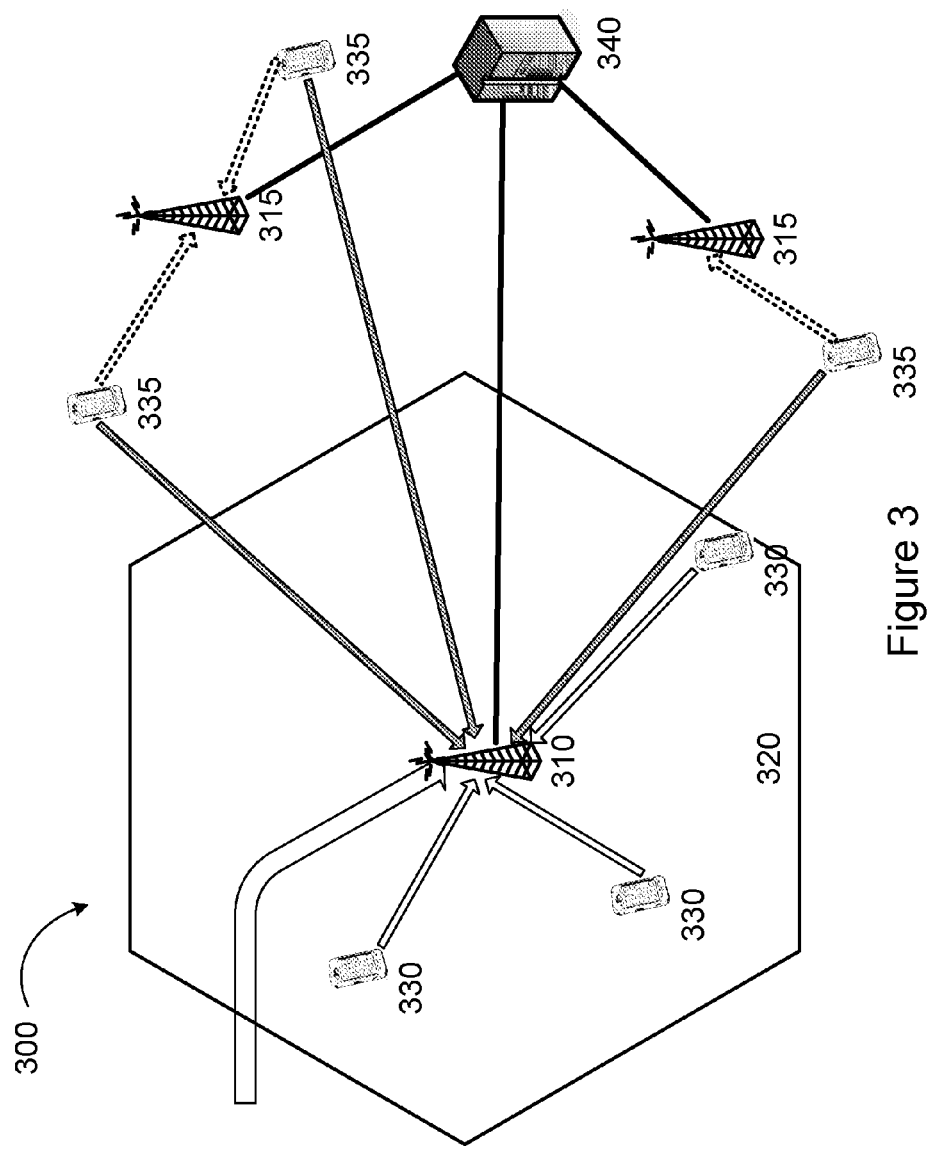
FIG. 3 illustrates an example scenario in which neighbor cell interference is determined.

FIG. 3 illustrates an example scenario in which a radio network node 310 (e.g., eNB, eNode B, Node B, base station (BS), radio base station (RBS), or similar) can estimate the neighbor cell interference. In the figure, the radio network node 310 serves one or more wireless terminals 330 (e.g., user equipment, mobile terminal, laptops, M2M (machine-to-machine) terminals, etc.) located within a corresponding cell 320. For clarity, the radio network node 310 will be referred to as an own radio network node, the cell 320 will be referred to as the cell of interest, and the terminals 330 within the cell of interest 320 will be referred to as own terminals. The solid white arrows from the own terminals 330 to the own radio network node 310 represent uplink signaling in the cell of interest 320.

The scenario in FIG. 3 also includes other radio network nodes 315 serving other wireless terminals 335. When the other terminals 335 transmit to their respective other radio network nodes 315 as indicated by dashed white arrows, these same signals are also received by the own radio network node 310 as indicated by shaded solid arrows. Such signals from the other terminals 335 act as interferers within the cell of interest 320. A sum of powers of these interfering signals experienced at the own radio network node 310 at time t will be denoted as $P_{neighbor}(t)$. In other words, the neighbor cell interference $P_{neighbor}(t)$ may be viewed as expressing a sum of interferences present in the cell of interest due to wireless activities applicable at time t in one or more cells other than in the cell of interest 320. Further, there is a large solid white arrow with no particular source. This represents the thermal noise $P_N(t)$ experienced in the own radio network node 310 of the cell of interest 320 at time t.

FIG. 3 also shows a network node 340, e.g., a RNC (radio network controller). Connections between the RNC 340 and the radio network nodes 310, 315 are illustrated as black lines (e.g., Iub connections). It should be noted that the radio network nodes 310, 315 may also communicate with each other as well. These connections are not illustrated so as to minimize clutter in FIG. 3. Moreover, there can be more than one RNC 340 (not illustrated) that may communicate with each other. The RNCs may also communicate with CN (core network) nodes (also not illustrated).

Figure 4:
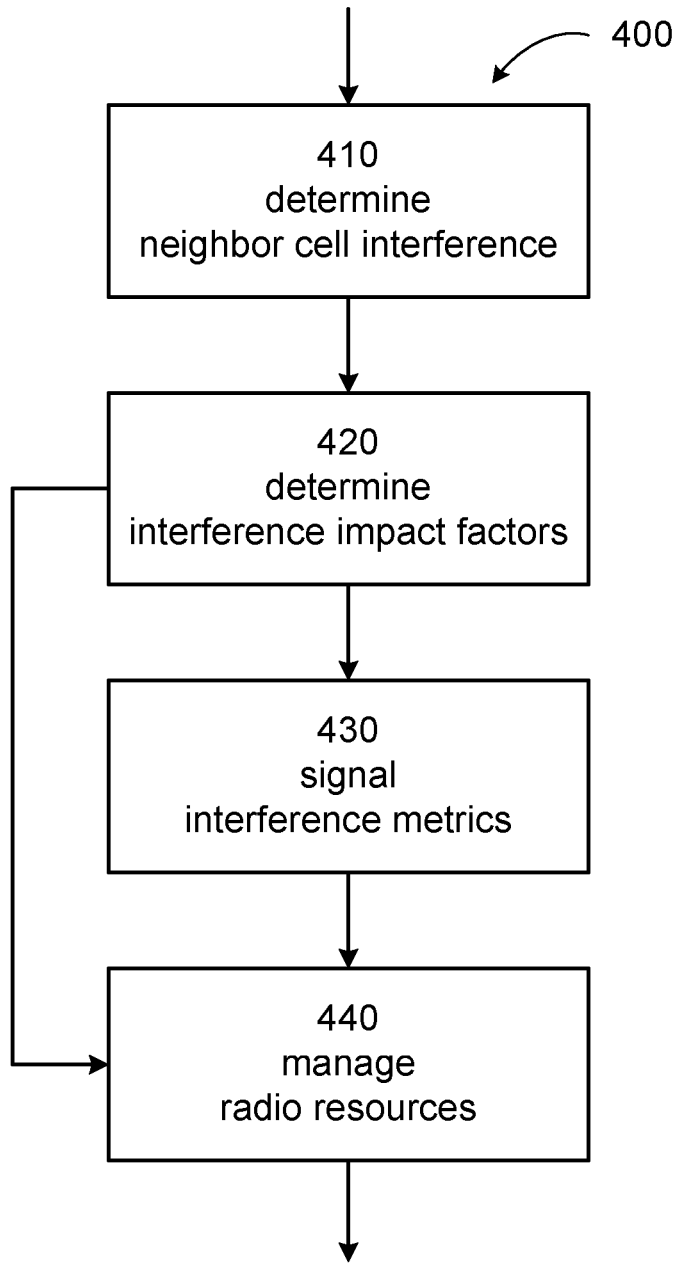
FIG. 4 illustrates a flow chart of a method performed by a node of a wireless network to manage radio resources.

FIG. 4 illustrates a non-limiting example of a method that may be performed by one or more nodes 310, 340 of the wireless network 300. The network 300 may be homogeneous or heterogeneous. In the method 400, a network node 310, 340 may determine (includes computing, estimating, receiving from another node, etc.) a neighbor cell interference power in step 410. The determination may be based on parameters such as measured load utilization and/or received total wideband power at an own cell 320 of a RBS 310. The network node may be the RBS 310 itself or another network node 340 (e.g., RNC, CN node, IM node, etc.).

For the own cell 320, the network node 310, 340 may determine one or more interference impact factors in step 420. Examples of interference on which the impact factors may depend upon include own cell power, soft handover power, softer handover power, and remaining neighbor cell interference power. In one aspect, the remaining neighbor cell interference power (or simply remaining neighbor cell interference) is the neighbor cell interference with one or both of the soft and softer handover powers (at least some portions thereof) subtracted therefrom. The node 310, 340 that determines the interference factors of the own cell 320 may be the same node or different from the node that determines the neighbor cell interference.

For ease of reference, the term "interference metric(s)" will be used to refer to the own cell power, the neighbor cell interference and/or the interference impact factors. In other words, interference metric(s) may include any one or more of the own cell power, the neighbor cell interference, the soft handover power, the softer handover power, and the remaining neighbor cell interference.

In step 430, the network node 310, 340 may signal (i.e., send) any one or more of interference metrics related to the own cell 320 of the RBS 310 to one or more other network nodes 315, 340. In one aspect, the node 310, 340 that determines the interference metric(s) may initially send to the other network nodes 315, 340. In another aspect, a node 315, 340 that receives the interference metric(s) may forward some or all of the received interference metric(s) to yet other network nodes 315, 340. The signalling may be through standardized and/or proprietary interface protocols.

Based on the interference metric(s) of the own cell 320, the network node 310, 340 may perform RRM (radio resource management) functions to manage the radio resources of the own cell 320. For example, the RBS 310 corresponding to the own cell 320 may perform the RRM functions. In another example, the RNC 340 or some other node (e.g., CN node, IM node, etc.) may manage the radio resources of the own cell 320. In yet another example, a combination of network nodes 310, 315, 330, 340 may cooperate.

Note that the network node 310, 340 may receive interference metric(s) corresponding to neighbor cell(s) from other network node(s) 315, 340. The network node 310, 340, either on its own or through cooperation with other nodes 310, 315, 340, may perform RRM functions to manage the radio resources of an own cell 320 based on the interference metric(s) of other cell(s).

It should also be noted that the method 400 illustrated in FIG. 4 may be repeatedly performed by the nodes 310, 340 of the wireless network 300. This allows the nodes 310, 340 to continually adapt to changing interference circumstances.

Figure 5:
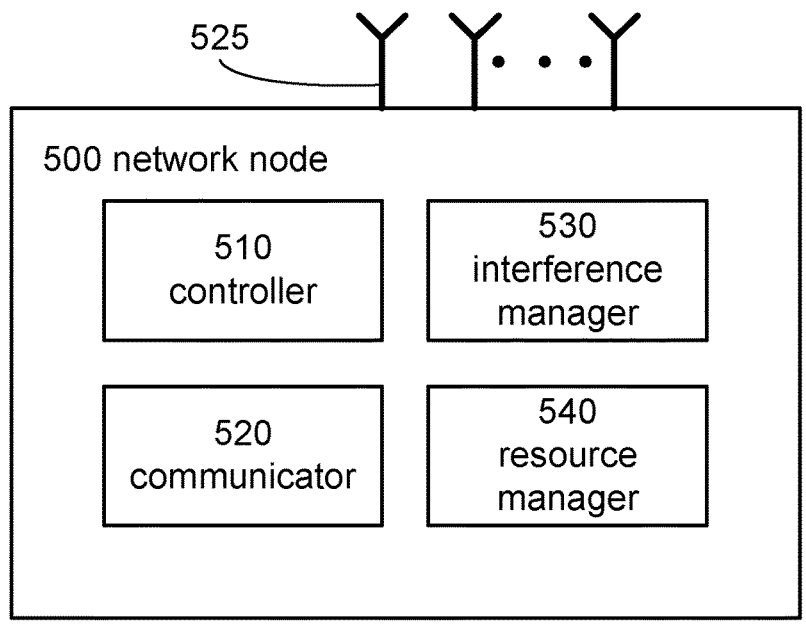
FIGS. 5 and 6 respectively illustrate example embodiments of a network node.

FIG. 5 illustrates an example embodiment of a network node 500 structured to manage radio resources in the network 300. The network node 500 may be a radio network node 310, a RNC 340, a core network node, and so on. The network node 500 may comprise several devices including a controller 510, a communicator 520, an interference manager 530, and a resource manager 540. The communicator 520 may be structured to perform wired and/or wireless communication with other network nodes (e.g., other radio network nodes 315, network nodes 340, etc), core network nodes, and/or wireless terminals 330, 335. The interference manager 530 may be structured to manage interferences. The resource manager 540 may be structured to perform resource management functions including scheduling radio resources to the wireless terminals 330. The controller 510 may be structured to control the overall operations of the radio network node 310.

Figure 6:
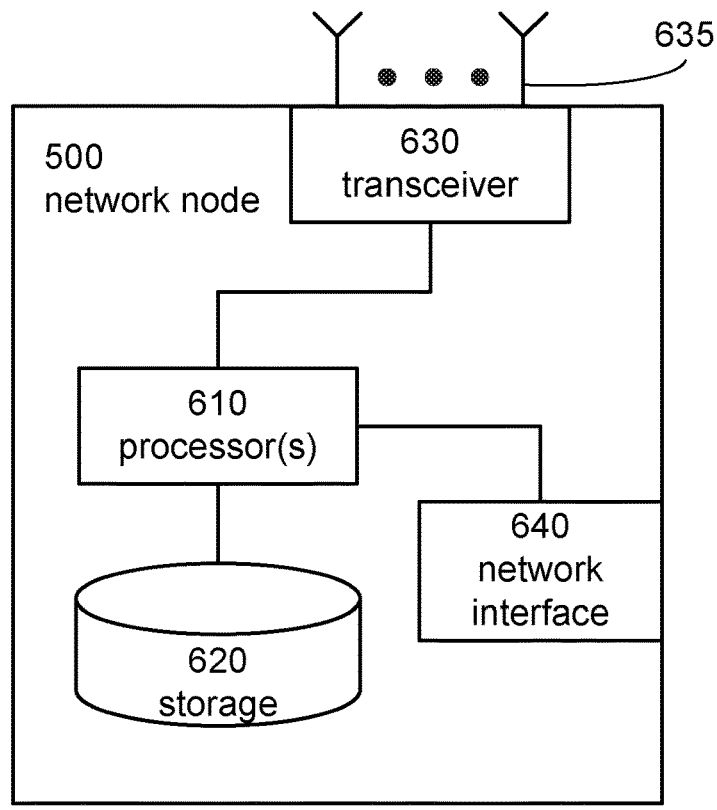

FIG. 5 provides a logical view of the network node 500 and the devices included therein. It is not strictly necessary that each device be implemented as physically separate modules or circuits. Some or all devices may be combined in a physical module. Also, one or more devices may be implemented in multiple physical modules as illustrated in FIG. 6.

The devices of the network node 500 need not be implemented strictly in hardware. It is envisioned that any of the devices maybe implemented through a combination of hardware and software. It is envisioned that any of the devices may be implemented through a combination of hardware and software. For example, as illustrated in FIG. 6, the network node 500 may include one or more processors 610 structured to execute program instructions stored in a non-transitory storage medium or in firmware (e.g., ROM, RAM, Flash) (denoted as storage 620) to perform the operations of the radio network node devices. The program instructions may also be received in a transitory manner, e.g., through externally provided signals. The wireless interface 630 (e.g., a transceiver) may be structured to wirelessly communicate with other network nodes 310, 335, 340 over one or more antennas 635. For example, microwave may be used for communication among the nodes of the network 300. The wireless interface 630 may also be structured to communicate with wireless terminals 330, 335. The network node 500 may also use a network interface 640, which may be a wired interface, to communicate with other network nodes 335, 340.

In one or more aspects, the network node 500 can be structured to implement a high performing estimator. The disclosed estimator can perform a joint estimation of interfering powers $P_{neighbor}(t)=P_N(t)$, $P_N(t)$, $P_{neighbor}(t)$ (note the upper case "P" for power) and the load utilization probability $p_{load}(t)$ (note the lower case "p" for probability). An extended Kalman filter (EKF) can be used in one or more embodiments of the proposed estimator.

The neighbor cell interference $P_{neighbor}(t)$ in this context may be viewed as a sum of interferences present in a cell of interest due to wireless activities applicable at time t in one or more cells other than in the cell of interest. In one or more aspects, the determination of the neighbor cell interference $P_{neighbor}(t)$ involves estimating the neighbor cell interference. In this document, estimations of parameters are indicated with a "^" (caret). For example, $\hat{P}_{neighbor}(t)$ may be read as an estimate of the neighbor cell interference $P_{neighbor}(t)$.

In the discussion above and below, the values of parameters are "estimated", "measured", "received" or "computed". A measured value in essence can be viewed a number that expresses a value of a measured quantity. An estimated value is not a number that expresses a value of a measurement, at least not directly. Rather, an estimate can be viewed as a processed set of measurements, e.g., by some filtering operation. There can also be received and/or computed quantities, such as time varying parameters that are obtained from other sources.

It is stressed that measured or estimated quantities can be very different, such as in case where the measured and estimated quantity refer to the same underlying physical quantity, e.g., a specific power. One among many reasons for this is that the processing to obtain estimates may combine measurements from different times to achieve e.g., noise suppression and bias reduction.

One very significant advantage of the disclosed estimator is its low order and associated low computational complexity. In one embodiment, the estimator can be a variant of an extended Kalman filter (EKF), structured for processing using the nonlinear interference model. The disclosed estimation models can be applied to one or both of the sliding window and the recursive RoT estimation algorithms. Also, either SIR or power based load factor calculation may be used.

The disclosed estimator can use any one or more of the following information:

Measurements of $P_{RTWP}(t)$, with a sampling rate of $T_{RTWP}=k_{RTWP}TTI$, $k_{RTWP} \in Z+$. Here Z+ denotes the set of positive integers. Preferably, the measurements are available for each antenna branch.

Computed load factors $L_{own}(t)$, with a sampling rate of $T_L=k_L TTI$, $k_L \in Z+$. Preferably, load factors are available per cell and are valid on cell level. They need not necessarily be valid on antenna branch level with Rx diversity.

The loop delay $T_D$ between the calculation of $L_{own}(t)$, and the time it takes effect on the air interface. The loop delay may be dependent on the TTI. Preferably, the loop delay is available for and valid per cell.

Measured load factors $\overline{L}_{own}(t)$, with a sampling rate of T $\overline{L}=k_{\overline{L}} TTI$, $k_{\overline{L}} \in Z+$. Preferably, the load factors are available per cell, and valid on the cell level. They need not necessarily be valid on the antenna branch level with Rx diversity. The factors can be obtained after TFCI (transport format combination indicator) decoding.

The loop delay $\overline{T}_D$ between the calculation of $\overline{L}_{own}(t)$, and the time it takes effect on the air interface. The loop delay can be dependent on the TTI and larger than $T_D$ since the measured load factor calculation may necessitate TFCI and E-TFCI (enhanced TFCI) decoding.

For adaptation to extended Kalman filtering, the following states are modeled:

$$x_1(t)=p_{load}(t)-\text{load utilization probability at time } t, \quad (12)$$

$$x_2(t)=P_{neighbor}(t)+P_N(t)-\text{interference-and-noise sum at time } t, \quad (13)$$

$$x_3(t)=\Delta \overline{L}_{own}(t)-\text{load factor bias at time } t, \quad (14)$$

$$x_4(t)=x_1(t-T)-\text{decoding delay incorporated.} \quad (15)$$

Since an additional decoding delay affects the loop, the first state $x_1(t)$ should be delayed by an extra state to define the fact that the load utilization probability measurement is subject to an additional delay T for decoding. The fourth state $x_4(t)$ is used for this purpose. The delay T can be any positive integer multiple of the TTI. Typically the delay T is equal to one TTI. In the equations for the states, $\Delta L_{own}(t)$ represents a slowly varying load factor bias error in the measurement model.

In the model, various measurements can be made available for processing. First of these is the total wideband power $P_{RTWP}(t)$. Note that the scheduled load of the own cell $L_{own}(t)$ is a computed quantity (e.g., based on SINR measurements). For this reason, it is advantageous to provide a measurement model of $P_{RTWP}(t)$, expressed in terms of the states, computed quantities and a measurement uncertainty. Towards this end, first note that the load in equation (6) does not account for the load utilization probability $p_{load}(t)$. Also, it does not account for the delay $T_D$.

To model the load utilization effect, and to compensate for semi-constant load factor errors, a review of equation (5)

suggests that load underutilization can be modeled by modifying equations (5) and (6) as:

$$L_{own,utilized}(t) = \sum_{i=1}^{I} p_{load}(t)L_i(t-T_D) + \Delta \overline{L}_{own}(t) = p_{load}(t)L_{own}(t-T_D) + \Delta \overline{L}_{own}(t), \quad (16)$$

$$P_{RTWP}(t) = L_{own,utilized}(t)P_{RTWP}(t) + P_{neighbor}(t) + P_N(t) \quad (17)$$

which results in $$P_{RTWP}(t) = \frac{1}{1 - L_{own}(t-T_D)p_{load}(t) + \Delta \overline{L}_{own}(t)}(P_{neighbor}(t) + P_N(t)). \quad (18)$$

After an addition of a zero mean white measurement noise $e_{RTWP}(t)$ and replacement of variables by the states (12)-(15), the following nonlinear measurement equations result:

$$y_{RTWP}(t) = \frac{x_2(t)}{1 - L_{own}(t-T_D)x_1(t) + x_3(t)} + e_{RTWP}(t), \quad (19)$$

$$R_{2,RTWP}(t) = E[e_{RTWP}^2(t)]. \quad (20)$$

In equations (19) and (20), $y_{RTWP}(t) = P_{RTWP}(t)$ and $R_{2,RTWP}(t)$ denotes the (scalar) covariance matrix of $e_{RTWP}(t)$. If the load of the own cell is computed using both EUL and R99 traffic, the delay can be valid for both. If the own cell load is estimated instead, $L_{own}(t-T_D)x_1(t)$ in equation (19) can be expressed by a state directly modeling the estimated load factor of the own cell. The own cell load factor appearing in equation (19) can be treated as a known time varying factor, not as an estimate.

Note that equation (19) can represent a nonlinear load curve, expressed in terms of an estimate of the load utilization probability $x_1(t) = p_{load}(t)$, an estimate of the interference-and-noise sum $x_2(t) = P_{neighbor}(t) + P_N(t)$ and an estimate of the load factor bias $x_3(t) = \Delta \overline{L}_{own}(t)$. That is, equation (19) can represent a nonlinear curve expressed in terms of $\hat{x}_1(t)$, $\hat{x}_2(t)$ and $\hat{x}_3(t)$. Further, the computed or received load factor can be used in the nonlinear load curve. Then equation (19) can be said to relate the momentary combined effect of the estimated quantities and received quantities to the left hand side of the equation, i.e., the momentary measurement of the wideband power. Note that in one or more embodiments, the thermal noise floor N(t) can be used to represent the thermal noise $P_N(t)$ and the thermal noise floor estimate $\hat{N}(t)$ can be used to represent thermal noise estimate $\hat{P}_N(t)$ in these equations.

Measurement of the load utilization probability $p_{load}(t)$ can be made available per cell. As an example, the decoded TFCIs (transport format combination indicator) and E-TFCISs (enhanced TFCI) show which grants the wireless terminal 330 actually used in the last TTI. This provides the information needed to compute the used load factor $\overline{L}_{own}(t)$ of the last TTI, and thus to compute:

$$p_{load}(t) = \frac{\overline{L}_{own}(t-T_D)}{L_{own}(t-T_D)}. \quad (21)$$

With such modification, the measurement model for the load utilization probability measurement becomes:

$$y_{loadUtilization}(t) = x_4(t) + e_{loadUtilization}(t), \quad (22)$$

$$R_{2,loadUtilization}(t) = E[e_{loadUtilization}(t)]^2. \quad (23)$$

The transformation equation (21) can be viewed as essentially replacing the granted load factor, $L_{own}(t-T_D)$, with the load factor computed based on the received TFCIs and E-TFCIs.

In the dynamic state model, random walk models can be adapted for the first and second state variables $x_1(t)$ and $x_2(t)$. To avoid a drifting bias correction of the load factor, an autoregressive model can be used for the third state $x_3(t)$. A further motivation for this is that the state can be expected to model errors that over an ensemble have a zero mean. Hence the following state model can result from the states of (12)-(15).

$$x(t+T) \equiv \begin{pmatrix} x_1(t+T) \\ x_2(t+T) \\ x_3(t+T) \\ x_4(t+T) \end{pmatrix} = \begin{pmatrix} 1 & 0 & 0 & 0 \\ 0 & 1 & 0 & 0 \\ 0 & 0 & a & 0 \\ 1 & 0 & 0 & 0 \end{pmatrix} \begin{pmatrix} x_1(t) \\ x_2(t) \\ x_3(t) \\ x_4(t) \end{pmatrix} + \begin{pmatrix} w_1(t) \\ w_2(t) \\ w_3(t) \\ w_4(t) \end{pmatrix} \quad (24)$$

$$R_1(t) = E\left[\begin{pmatrix} w_1(t) \\ w_2(t) \\ w_3(t) \\ w_4(t) \end{pmatrix} (w_1(t) \; w_2(t) \; w_3(t) \; w_4(t))\right]. \quad (25)$$

Preferably, the delay T equals one TTI, but can be any positive integer multiple of the TTI. Note that by setting a=1, a random walk model can be obtained for all states. A diagonal covariance matrix can be used. The last component of the system noise is preferably selected to be very small, reflecting the pure delay it is intended to model.

A general state space model behind the EKF (Extended Kalman Filter) can be expressed as follows:

$$x(t+T) = A(t)x(t) + B(t)u(t) + w(t). \quad (26)$$

$$y(t) = c(x(t)) + e(t). \quad (27)$$

Note that boldface symbols indicate that the underlying quantity is a vector or matrix variable. In the vector equations (26) and (27), x(t) denotes a state vector, u(t) denotes an input vector (not used in this particular instance), y(t) denotes an output measurement vector comprising power measurements performed in a cell, w(t) denotes the so called systems noise that represents the model error, and e(t) denotes the measurement error. The matrix A(t) is a system matrix describing the dynamic modes, the matrix B(t) is the input gain matrix, and the vector c(x(t)) is the measurement vector which is a function of the states, possibly nonlinear, of the system. Finally, t represents the time and T represents the sampling period.

The general case with a nonlinear measurement vector is considered here. For this reason, the EKF is applied. This filter is given by the following matrix and vector iterations.

Initialization $t = t_0$ $\hat{x}(0 | -1) = x_0$ $P(0 | -1) = P_0$

-continued

Iteration $t = t + T$ $C(t) = \frac{\partial c(x)}{\partial x}\bigg|_{x=\hat{x}(t|t-T)}$ $K_f(t) = P(t|t-T)C^T(t)(C(t)P(t|t-T)C^T(t) + R_2(t))^{-1}$ $\hat{x}(t|t) = \hat{x}(t|t-T) + K_f(t)(y(t) - c(\hat{x}(t|t-T)))$ $P(t|t) = P(t|t-T) - K_f(t)C(t)P(t|t-T)$ $\hat{x}(t+T|t) = A\hat{x}(t|t) + Bu(t)$ $P(t+T|t) = AP(t|t)A^T + R_1(t).$ End. (28)

The quantities introduced in the filter iterations (28) are different types of estimates ($\hat{x}(t|t-T)$, $\hat{x}(t|t)$, $P(t|t-T)$, and $P(t|t)$), function of such estimates ($C(t)$ and $K_f(t)$), or other quantities ($R_2(t)$ and $R_1(t)$), defined as follows:
  $\hat{x}(t|t-T)$ denotes a state prediction, based on data up to time t−T,
  $\hat{x}(t|t)$ denotes a filter update, based on data up to time t,
  $P(t|t-T)$ denotes a covariance matrix of the state prediction, based on data up to time t−T,
  $P(t|t)$ denotes a covariance matrix of the filter update, based on data up to time t,
  $C(t)$ denotes a linearized measurement matrix (linearization around the most current state prediction),
  $K_f(t)$ denotes a time variable Kalman gain matrix,
  $R_2(t)$ denotes a measurement covariance matrix, and
  $R_1(t)$ denotes a system noise covariance matrix.

Note that $R_1(t)$ and $R_2(t)$ are often used as tuning variables of the filter. In principle, the bandwidth of the filter can be controlled by the matrix quotient of $R_1(t)$ and $R_2(t)$.

An example of the estimation scheme using the EKF will be described. The quantities of the EKF for estimation of the neighbor cell interference and the load utilization load factor bias can now be defined. Using equations (19)-(20) and (22)-(25) and (28) it follows that:

$$C(t) = \begin{pmatrix} C_{11}(t) & C_{12}(t) & C_{13}(t) & 0 \\ 0 & 0 & 0 & C_{24}(t) \end{pmatrix} \quad (29)$$

$$C_{11}(t) = \frac{L_{own}(t-T_D)\hat{x}_2(t|t-T)}{(1-L_{own}(t-T_D)\hat{x}_1(t|t-T)+\hat{x}_3(t|t-T))^2} \quad (30)$$

$$C_{12}(t) = \frac{1}{1-L_{own}(t-T_D)\hat{x}_1(t|t-T)+\hat{x}_3(t|t-T)} \quad (31)$$

$$C_{13}(t) = -\frac{\hat{x}_2(t|t-T)}{(1-L_{own}(t-T_D)\hat{x}_1(t|t-T)+\hat{x}_3(t|t-T))^2} \quad (32)$$

$$C_{24}(t) = 1 \quad (33)$$

$$R_2(t) = \quad (34)$$

$$E\left[\begin{pmatrix} e_{RTWP}(t) \\ e_{loadUtilization}(t) \end{pmatrix}(e_{RTWP}(t) \; e_{loadUtilization}(t))\right]\begin{pmatrix} R_{2,11}(t) & R_{2,12}(t) \\ R_{2,12}(t) & R_{2,22}(t) \end{pmatrix}$$

$$c(\hat{x}(t|t-T)) = \begin{pmatrix} \frac{\hat{x}_2(t|t-T)}{1-L_{own}(t-T_D)\hat{x}_1(t|t-T)+\hat{x}_3(t|t-T)} \\ \hat{x}_4(t|t-T) \end{pmatrix} \quad (35)$$

$$A = \begin{pmatrix} 1 & 0 & 0 & 0 \\ 0 & 1 & 0 & 0 \\ 0 & 0 & a & 0 \\ 1 & 0 & 0 & 0 \end{pmatrix} \quad (36)$$

$$B = 0 \quad (37)$$

$$R_1(t) = E\left[\begin{pmatrix} w_1(t) \\ w_2(t) \\ w_3(t) \\ w_4(t) \end{pmatrix}(w_1(t) \; w_2(t) \; w_3(t) \; w_4(t))\right] \quad (38)$$

$$= \begin{bmatrix} R_{1,11}(t) & R_{1,12}(t) & R_{1,13}(t) & R_{1,14}(t) \\ R_{1,12}(t) & R_{1,22}(t) & R_{1,23}(t) & R_{1,24}(t) \\ R_{1,13}(t) & R_{1,23}(t) & R_{1,33}(t) & R_{1,34}(t) \\ R_{1,14}(t) & R_{1,24}(t) & R_{1,34}(t) & R_{1,44}(t) \end{bmatrix}.$$

To execute the EKF, the state prediction and the state covariance prediction applicable at time t are needed, they are given by the following equations:

$$\hat{x}(t|t-T) = \begin{pmatrix} \hat{x}_1(t|t-T) \\ \hat{x}_2(t|t-T) \\ \hat{x}_3(t|t-T) \\ \hat{x}_4(t|t-T) \end{pmatrix} \quad (39)$$

$$P(t|t-T) = \quad (40)$$

$$\begin{pmatrix} P_{11}(t|t-T) & P_{12}(t|t-T) & P_{13}(t|t-T) & P_{14}(t|t-T) \\ P_{12}(t|t-T) & P_{22}(t|t-T) & P_{23}(t|t-T) & P_{24}(t|t-T) \\ P_{13}(t|t-T) & P_{23}(t|t-T) & P_{33}(t|t-T) & P_{34}(t|t-T) \\ P_{14}(t|t-T) & P_{24}(t|t-T) & P_{34}(t|t-T) & P_{44}(t|t-T) \end{pmatrix}.$$

Equations (29)-(40) define the EKF completely, when inserted in (28). The final step to compute the neighbor cell interference estimate can be:

$$\hat{P}_{neighbor}(t|t) = \hat{x}_2(t|t) - \hat{P}_N(t|t). \quad (41)$$

FIG. 34 illustrates a flow chart of example method 3400 performed by network node 500 to implement a high performing estimator. The method 3400 may be performed by the interference manager 530, e.g., as load estimation functionality associated with the scheduler, to determine the neighbor cell interference $P_{neighbor}(t)$. In particular, the neighbor cell interference estimate $\hat{P}_{neighbor}(t)$ can be determined. The neighbor cell interference $P_{neighbor}(t)$ can express a sum of interferences present in the cell of interest 420 due to wireless activities applicable at the time t in one or more cells other than in the cell of interest.

As illustrated, in step 3410, the network node 500, and in particular the resource manager 540, can estimate the load utilization probability $p_{load}(t_1)$ to obtain a load utilization probability estimate $\hat{p}_{load}(t_1)$ applicable at a time $t=t_1$. The estimation can be made based on at least on a load utilization probability estimate $\hat{p}_{load}(t_0)$ and an interference-and-noise sum estimate $\hat{P}_{neighbor}(t_0) + \hat{P}_N(t_0)$ applicable at time $t=t_0$. It should be noted that the term "t" enclosed in parentheses in the expressions without subscripts (e.g., $P_{neighbor}(t)$, $p_{load}(t)$, etc.) is intended to indicate time variable in general, and the same term "t" enclosed in parentheses with subscripts (e.g., $P_{neighbor}(t_0)$, $p_{load}(t_1)$, etc.) is intended to indicate a particular time. Thus, time $t_1$ may also be viewed as $t=t_1$ for example.

The particular times $t_0$ and $t_1$ are assumed such that $t_1-t_0=T>0$. T can represent a duration between estimation times. In an embodiment, T is a positive integer multiple of a transmission time interval, preferably one (e.g., for 10 ms TTI) but can be larger (e.g., 5 for 2 ms TTI). In the method 3400, it can be assumed the values of the quantities at time $t=t_0$ (or simply at time $t_0$) are known (have been measured, computed, received, or otherwise have been determined), and the values of one or more quantities at time $t=t_1$ are estimated or otherwise predicted.

In step 3420, the network node 500 can estimate the interference-and-noise sum $P_{neighbor}(t_1)+P_N(t_1)$ to obtain the interference-and-noise sum estimate $\hat{P}_{neighbor}(t_1)+\hat{P}_N(t_1)$ applicable at the time $t=t_1$. This estimation can be made based at least on the load utilization probability estimate $\hat{p}_{load}(t_0)$ and the interference-and-noise sum estimate $\hat{P}_{neighbor}(t_0)+\hat{P}_N(t_0)$.

FIG. 35 illustrates a flow chart of an example process performed by the network node 500 to implement the steps 3410 and 3420 to obtain the load utilization probability estimate $\hat{p}_{load}(t_1)$ and to obtain the interference-and-noise sum estimate $\hat{P}_{neighbor}(t_1)+\hat{P}_N(t_1)$. In step 3510, a scheduled load factor $L_{own}(t_1-T_D)$ can be calculated. Here, $T_D$ can represent a delay between the calculation of the scheduled load factor and a time the schedule takes effect on an air interface. The scheduled load factor $L_{own}(t-T_D)$ can express an amount of the radio resource grants scheduled to be used by the cell terminals 430 for uplink transmissions at the time t.

In step 3520, a used load factor $\bar{L}_{own}(t_1-T_D)$ can be obtained. Note that the used load factor $\bar{L}_{own}(t-T_D)$ can express an amount of the scheduled radio resource grants used by the cell terminals 430 for the uplink transmissions at the time t.

In step 3530, a load utilization $$\frac{\bar{L}_{own}(t_1-T_D)}{L_{own}(t_1-T_D)}$$

can be measured or
otherwise determined. Based on the measured load utilization $$\frac{\bar{L}_{own}(t_1-T_D)}{L_{own}(t_1-T_D)},$$

the load utilization probability estimate $\hat{p}_{load}(t_1)$ can be obtained in step 3540 and the interference-and-noise sum estimate $\hat{P}_{other}(t_1)+\hat{P}_N(t_1)$ can be obtained in step 3550.

FIG. 36 illustrates a flow chart of another example process performed by the network node 500 to implement the steps 3410 and 3420 to obtain the load utilization probability estimate $\hat{p}_{load}(t_1)$ and to obtain the interference-and-noise sum estimate $\hat{P}_{neighbor}(t_1)+\hat{P}_N(t_1)$. In step 3610, a total wideband power $y_{RTWP}(t_1)$ can be measured. Based on the measured total wideband power $y_{RTWP}(t_1)$ the load utilization probability estimate $\hat{p}_{load}(t_1)$ can be obtained in step 3620, and the interference-and-noise sum estimate $\hat{P}_{neighbor}(t_1)+\hat{P}_N(t_1)$ can be obtained in step 3630.

Referring back to FIG. 34, once the interference-and-noise sum estimate $\hat{P}_{neighbor}(t_1)+\hat{P}_N(t_1)$ is determined in step 3420, the network node 500 can estimate the neighbor cell interference $P_{neighbor}(t_1)$ to obtain the neighbor cell interference estimate $\hat{P}_{neighbor}(t_1)$. The estimation can be based at least on the interference-and-noise sum estimate $\hat{P}_{neighbor}(t_1)+\hat{P}_N(t_1)$ and a thermal noise estimate $\hat{P}_N(t_1)$. Note that the interference-and-noise sum $P_{neighbor}(t)+P_N(t)$ can express a sum of undesired signals, other than an own cell load $P_{own}(t)$. In FIG. 3, the interference-and-noise sum $P_{neighbor}(t)+P_N(t)$ are visually illustrated with shaded arrows (from the other terminals 335) and the large white arrow.

It can then be seen that once the once the interference-and-noise sum estimate $\hat{P}_{neighbor}(t_1)+\hat{P}_N(t_1)$ is determined, the neighbor cell interference estimate $\hat{P}_{neighbor}(t)$ can be arrived at if the thermal noise $\hat{P}_N(t)$ can be determined. FIG. 37 illustrates a flow chart of an example process performed by the network node 500 to implement the step 3430 of estimating the neighbor cell interference $P_{neighbor}(t_1)$. In step 3710, the thermal noise estimate $\hat{P}_N(t_1)$ can be obtained. In one embodiment, a thermal noise floor estimate $\hat{N}(t_1)$ corresponding to the cell of interest 420 can be obtained as the thermal noise estimate $\hat{P}_N(t_1)$. In step 3720, thermal noise estimate $\hat{P}_N(t_1)$ can be subtracted from the interference-and-noise sum estimate $\hat{P}_{neighbor}(t_1)+\hat{P}_N(t_1)$ to obtain the neighbor cell interference estimate $\hat{P}_{neighbor}(t_1)$.

Figure 38:
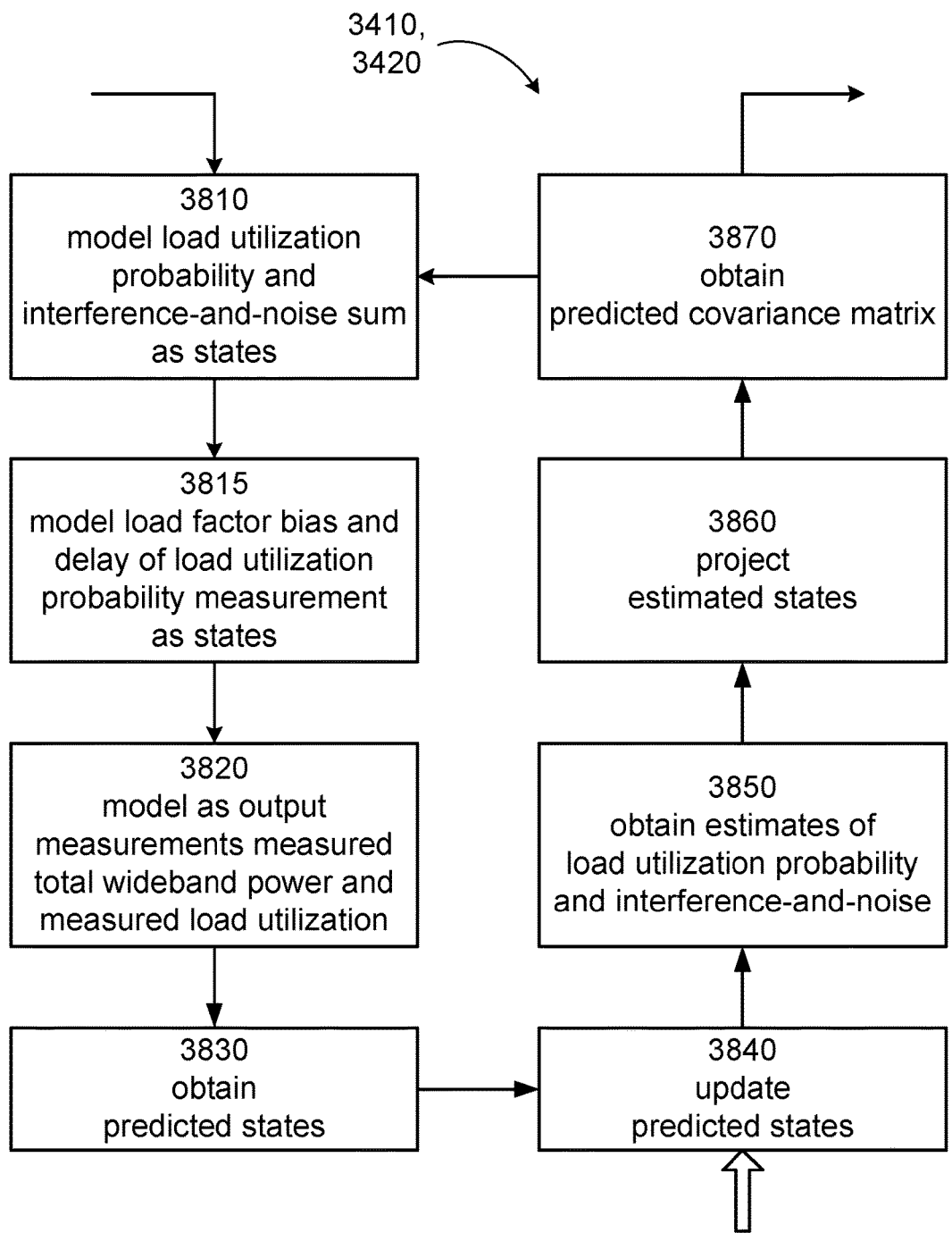
FIG. 38 illustrate a flow chart of another process performed by a network node to estimate load utilization probabilities and sum of interference and noise.

FIG. 38 illustrates another flow chart of an example process performed by the network node 500 to implement the steps 3410 and 3420 to obtain the load utilization probability estimate $\hat{p}_{load}(t_1)$ and to obtain the interference-and-noise sum estimate $\hat{P}_{neighbor}(t_1)+\hat{P}_N(t_1)$. FIG. 38 may be viewed as a specific instance of the flow chart illustrated in FIG. 35. In FIG. 38, the extended Kalman filtering adapted for estimation is used.

In step 3810, the load utilization probability $p_{load}(t)$ and the interference-and-noise sum $P_{neighbor}(t)+P_N(t)$ can be modeled as first and second states $x_1(t)=p_{load}(t)$, $x_2(t)=P_{neighbor}(t)+P_N(t)$ in a state vector $x(t)$ of a state space model.

In this context, the state space model can be characterized through equations $x(t+T)=A(t)x(t)+B(t)u(t)+w(t)$ and $y(t)=c(x(t))+e(t)$. In these equations, $x(t)$ represents the state vector, $u(t)$ represents an input vector, $y(t)$ represents the output measurement vector, $w(t)$ represents a model error vector, $e(t)$ represents a measurement error vector, $A(t)$ represents a system matrix describing dynamic modes of the system, $B(t)$ represents an input gain matrix, $c(x(t))$ represents a measurement vector which is a function of the states of the system, t represents the time and T represents a sampling period. Thus, it is seen that modeling errors and measurement errors are incorporated in the state space model.

In step 3820, the measured total wideband power $y_{RTWP}(t)$ and the measured load utilization $y_{loadUtilization}(t)$ can be modeled in the output measurement vector $y(t)$ of the state space model.

In step 3830, a predicted state vector $\hat{x}(t_1|t_0)$ can be obtained. The predicted state vector $\hat{x}(t_1|t_0)$ includes first and second predicted states $\hat{x}_1(t_1|t_0)$, $\hat{x}_2(t_1|t_0)$ whose values are based on the load utilization probability estimate $\hat{p}_{load}(t_0)$ and the interference-and-noise sum estimate $\hat{P}_{neighbor}(t_0)+\hat{P}_N(t_0)$. In this context, the predicted state vector $\hat{x}(t|t-T)$ denotes a prediction of the state vector $x(t)$ based on information available up to time $t-T$. Recall from above that $t_1-t_0=T>0$. Thus, the predicted state vector $\hat{x}(t_1|t_0)$ denotes a prediction the state vector $x(t)$ at time $t=t_1$ based on information available up to time $t=t_0$. The time $t=t_0$ can be a time of initialization or a time of a previous iteration.

In step 3840, the predicted state vector $\hat{x}(t_1|t_0)$ can be updated based on one or more measurements included in an output measurement vector $y(t_1)$ applicable at the time $t=t_1$ to obtain an estimated state vector $\hat{x}(t_1|t_1)=\hat{x}(t_1)$. The measurements can include the measured received total wideband power $y_{RTWP}(t_1)$ and the load utilization $y_{load}(t_1)$. The solid white arrow entering the step 3840 in FIG. 38 is to indicate that measurements may come into the step. Generally, the estimated state vector $\hat{x}(t|t)=\hat{x}(t)$ denotes an estimate of the state vector x(t) based on information available up to time t. This step corresponds to an adjusting step of the Kalman filter algorithm in which the prediction made in the previous time (e.g., at time $t=t_0$) is adjusted according to measurements made in the current time (e.g., at time $t=t_1$).

In step 3850, first and second estimated states $\hat{x}_1(t_1)$, $\hat{x}_2(t_1)$ can be obtained from the estimated state vector $\hat{x}(t_1)$ respectively as the load utilization probability estimate $\hat{x}_1(t_1) = \hat{p}_{load}(t_1)$ and the interference-and-noise sum estimate $\hat{x}_2(t_1) = \hat{P}_{neighbor}(t_1) + \hat{P}_N(t_1)$.

In step 3860, the estimated state vector $\hat{x}(t_1)$ is projected based at least on dynamic modes corresponding to the cell of interest to obtain a predicted state vector $\hat{x}(t_2|t_1)$, $t_2-t_1=T$. Here, the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-noise sum estimate $\hat{x}_2(t_1) = \hat{P}_{neighbor}(t_1) + \hat{P}_N(t_1)$. This step corresponds to a predicting step of the Kalman filter algorithm in which future states are predicted based on current information. As seen, the steps in FIG. 38 can be iteratively performed.

In one embodiment, the steps 3840 and 3860 of updating the predicted state vector $\hat{x}(t_1|t_0)$ and of projecting the estimated state vector $\hat{x}(t_1|t_1)$ comprise performing a Kalman filter process to iteratively predict and update the state vector x(t) to obtain the estimated state vector $\hat{x}(t)$. Here, the estimated state vector $\hat{x}(t)$ includes the first and second estimated states $\hat{x}_1(t)$ and $\hat{x}_2(t)$ corresponding to the load utilization probability estimate $\hat{p}_{load}(t)$ and the interference-and-noise sum estimate $\hat{P}_{neighbor}(t) + \hat{P}_N(t)$.

In addition to the load utilization probability $p_{load}(t)$ and the interference-and-noise sum $P_{neighbor}(t) + P_N(t)$ modeled as first and second states $x_1(t) = p_{load}(t)$, $x_2(t) = P_{neighbor}(t) + P_N(t)$ in step 3810, third and fourth states $x_3(t) = \Delta L_{own}(t)$, $x_4(t) = x_1(t-T)$ may also be modeled in the state vector x(t) of the state space model in step 3815. The third state $x_3(t) = \Delta \bar{L}_{own}(t)$ can represent a load factor bias expressing an error of a scheduled load factor $L_{own}(t)$, and the fourth state $x_4(t) = x_1(t-T)$ can reflect that the load utilization probability measurement is subject to a delay corresponding to the sampling period T. The step 3815 need not be performed if the third and fourth states are not used, and therefore, can be considered as optional. However, the third and fourth states are preferred to be used.

A basis for the data generation is a large set of UL power files generated in a high fidelity system simulator. The files represent bursty traffic, with varying mix of speech and data traffic, at different load levels. These data files were combined in different ways by MATLAB code which generates the UL power components, i.e., own cell traffic, neighbor cell traffic, thermal noise and the summed up RTWP. The load factor of the own cell is also computed. In the simulator, it is possible to perform any one or more of:

Select the average power levels of the components, with respect to the thermal noise floor level;

Select the number of neighbors used for neighbor cell interference;

The load utilization probability of the own cell, fix or varying between two limits;

The loop delay of the load factor (related to grant loop delay);

Set daily load patterns, and perturb these day to day by a randomization algorithm.

MATLAB reference code implementing an example of the disclosed neighbor cell interference estimation algorithm was used for performance simulations. Each run was 720000 10 ms TTIs, i.e, two hours of traffic. The load utilization probability was varied. The variation was very fast with changes every few TTIs. The mean power levels of the neighbor cell interference and the own cell were also varied between simulations, as was the load factor bias. The disclosed neighbor cell interference estimation algorithm performed very well. The simulations verified the following:

Accurately estimated load utilization with a bandwidth close to TTI bandwidth;

Accurately tracked true signal at the TTI bandwidth, with error below 10% (rms). Average error was 10.4 dB below the mean neighbor cell power in the simulations.

Figure 7:
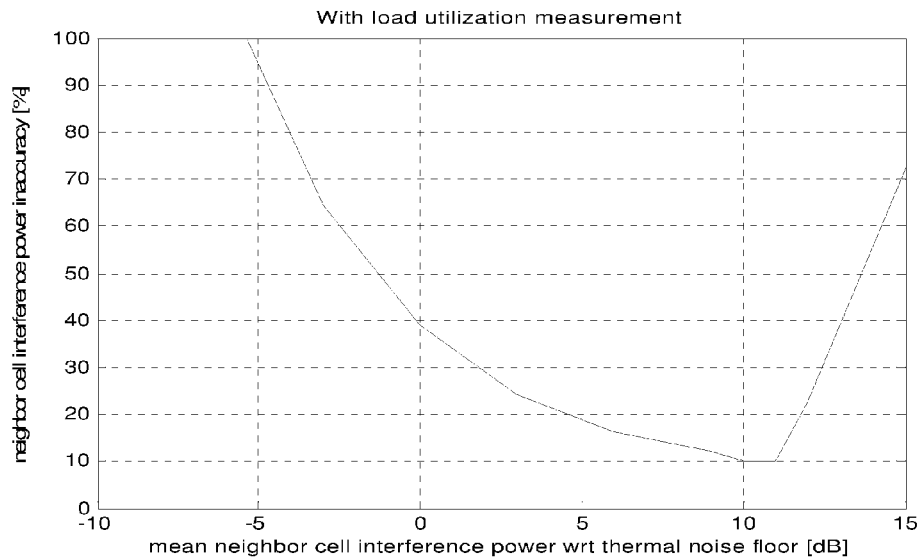
FIG. 7 is a plot of the inaccuracy of a neighbor cell interference estimate simulation as a function of the mean neighbor cell interference power.

Repeated simulations were then used to characterize the estimator performance. The accuracy of the neighbor cell interference estimate was addressed as a function of the involved power levels. FIG. 7 is a plot of the inaccuracy of the neighbor cell interference estimate, as a function of the mean neighbor cell interference power. Measurements of $P_{RTWP}(t)$ and $p_{load}(t)$ were used. The scheduled mean own cell interference power was 5 dB above the thermal noise power floor level.

It is evident that one factor that affects the inaccuracy is the SNR of the neighbor cell interference in the simulated signals that are used for estimation of the neighbor cell interference power. The inaccuracy is reduced when the neighbor cell interference grows at the expense of the own cell power. However, this may be true only up to a limit where the mean RoT becomes too high. Then the estimator works in a very steep region of the load curve, and above a certain level the estimation problem may become too sensitive, resulting in a rapidly increasing inaccuracy.

The results indicate that the accuracy of the estimator is good in regions where the neighbor cell interference is high and when it affects performance (well above the thermal noise power floor, and when it is large relative to the own cell power). This holds up to interference levels of about 10 dB mean RoT. Note that mean RoT above 10 dB represent a very high load, with RoT peaking at least at 20-25 dB. Hence, the results indicate that the estimator should be capable to provide useful estimates in the majority of the interference region of interest.

Neighbor Cell, Soft and Softer Interference Separation

In one or more aspects, the energies of soft and/or softer handovers may be used to refine the neighbor cell interference estimates. The total usable energy of UEs connected to cells in a softer handover is only partly included in the load factor of the own cell above. However, using the knowledge in the RBS of which UEs that are in softer handover allows the softer handover energies to be computed and distributed within the cells of the RBS. The softer handover energy can then be separated from the neighbor cell interference and be subject to level dependent scheduling and power control actions. It is relatively straight forward to use the load factor definition to compute the softer handover energy of cell j, utilized in cell i at any time as:

$$\hat{P}_{softer,i,j}(t|t) = \sum_{j\ in\ softer\ i} \bar{L}_j(t)\hat{P}_{RTWP,j}(t|t) = \bar{L}_{softer,j}(t)\hat{P}_{RTWP,j}(t|t) \quad (42)$$

Note that the measured load factor is used in equation (42). This may indicate a need for a more advance estimator for the separation of the softer handover energy.

The procedure for the soft handover case can be very similar to the softer handover case in principle, i.e., $$\hat{P}_{soft,i,j}(t|t) = \sum_{j \text{ in soft } i} \overline{L}_j(t)\hat{P}_{RTWP,j}(t|t) = \overline{L}_{soft,j}(t)\hat{P}_{RTWP,j}(t|t) \quad (43)$$

One difficulty with the soft handover case is that the estimated received total wideband power and the soft load factors are only available in the neighbor RBSs. As will be further described below, one or more aspects are directed to signalling between network nodes (e.g., between neighboring RBSs) to share these quantities between the RBSs.

The "remaining neighbor cell interference" that is not included in the above soft and softer interference powers may then be obtained by subtraction from the neighbor cell interference, which can be estimated using the EKF described above. That is, the remaining neighbor cell interference may be determined as:

$$\hat{P}_{neighborRemaining,i}(t|t) = \quad (44)$$
$$\hat{P}_{neighbor,i}(t|t) - \sum_j \hat{P}_{softer,i,j}(t|t) - \sum_j \hat{P}_{soft,i,j}(t|t).$$

In equation (44), $\hat{P}_{neighbor,i}(t|t)$ refers to the quantity being experienced in cell i.

Neighbor Cell, Soft and Softer Interference Signalling

As mentioned, network nodes may communicate with each other to exchange one or more parameters related to interferences. Signalling may involve at least one information element. Each information element may include one or more of:
- an own cell interference $\hat{P}_{own}(t|t)$,
- a neighbor cell interference estimate $\hat{P}_{neighbor}(t|t)$,
- a softer interference estimate $\hat{P}_{softer, i, j}(t|t)$,
- a soft interference estimate $\hat{P}_{soft, i, j}(t|t)$, and
- a remaining neighbor cell interference estimate $\hat{P}_{neighborRemaining}(t|t)$. The estimates may be encoded.

Note that instead of or in addition to signalling of powers, it is possible to signal load factors and the corresponding total power, to which the load factor is associated.

Figure 8:
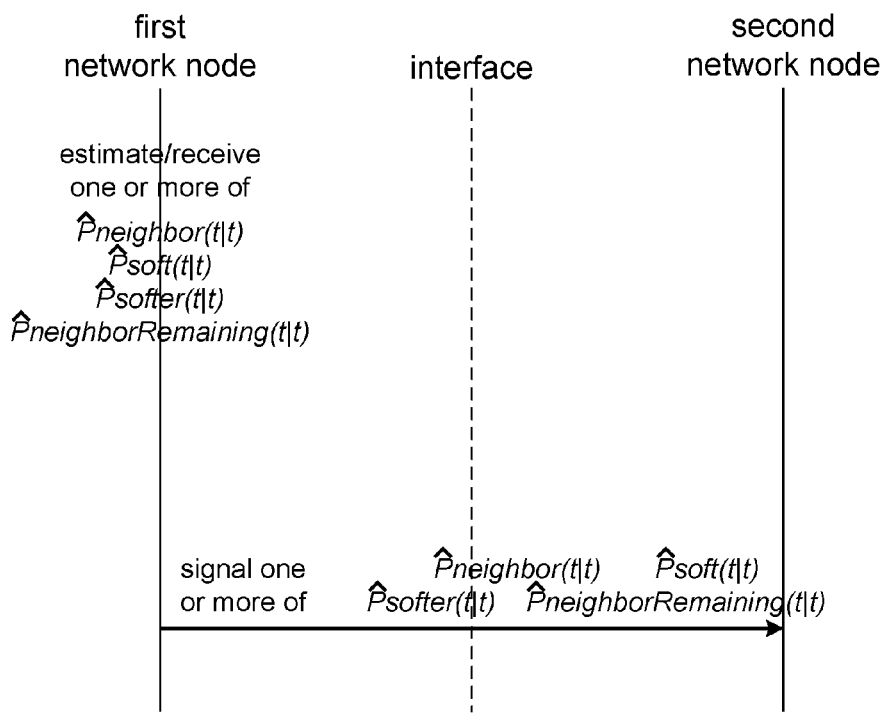
FIGS. 8-14 illustrate examples of signalling between two network nodes to exchange interference related parameters.
Figure 9:
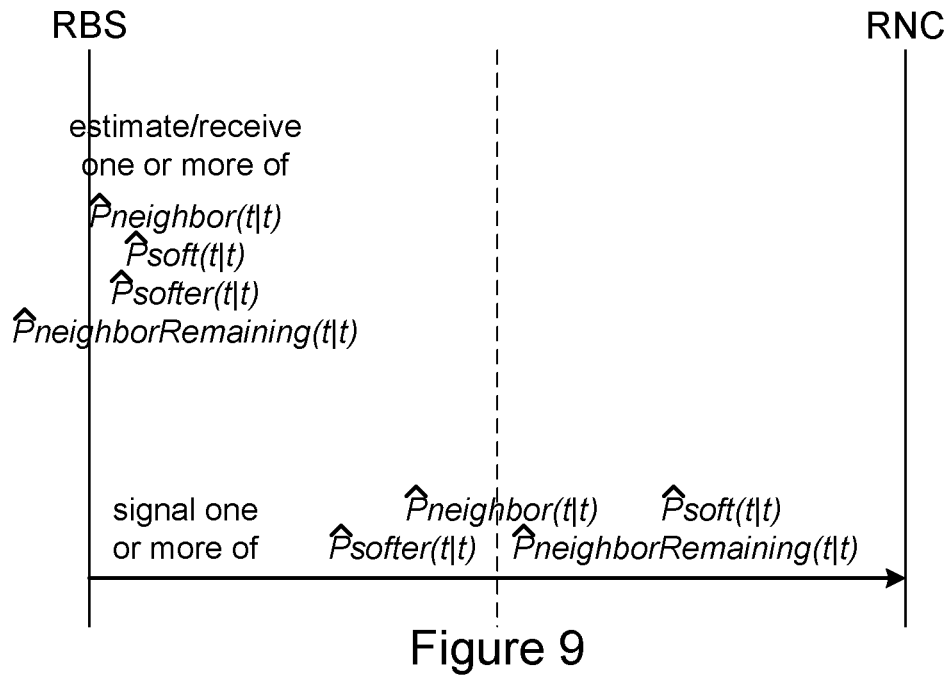
Figure 10:
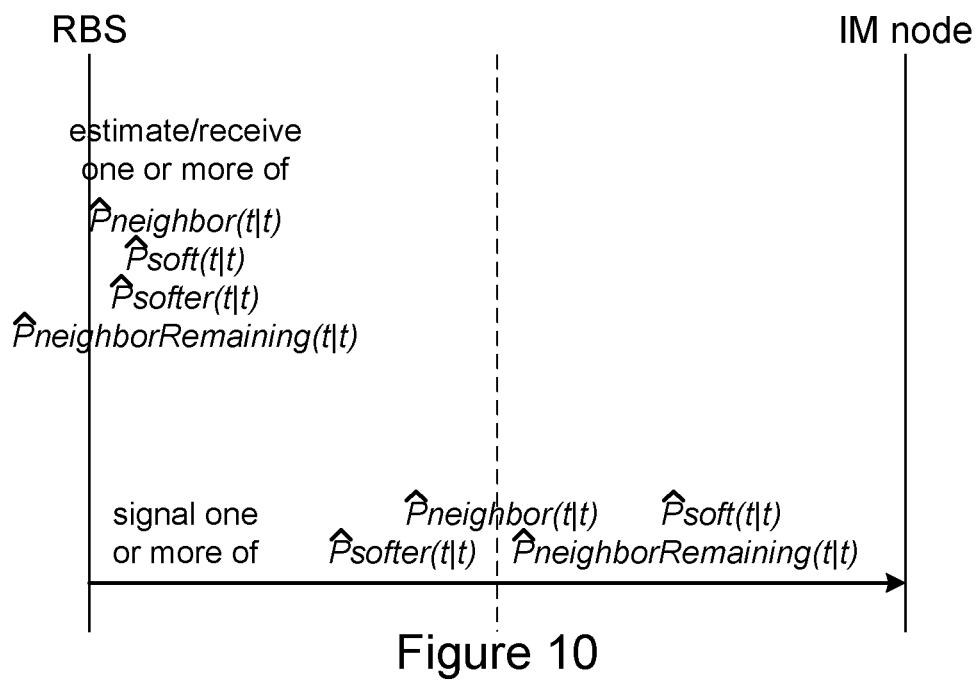
Figure 11:
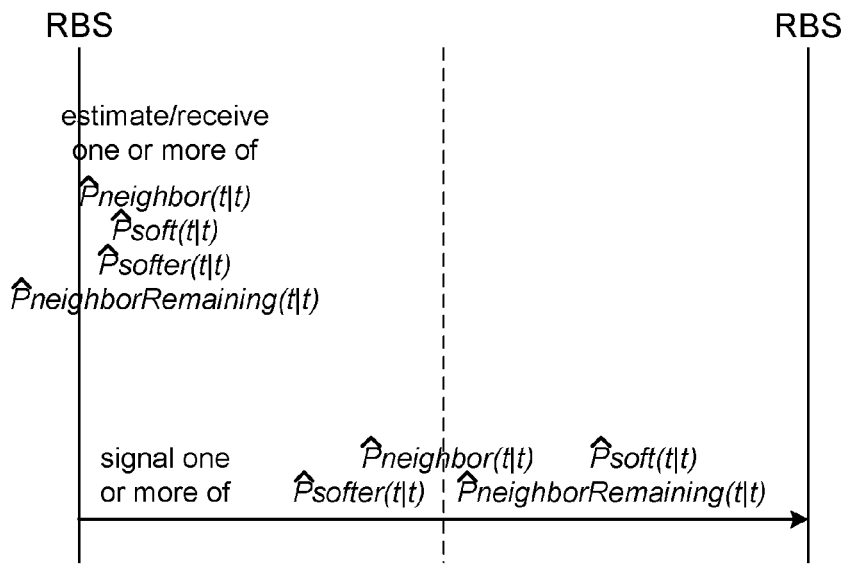
Figure 12:
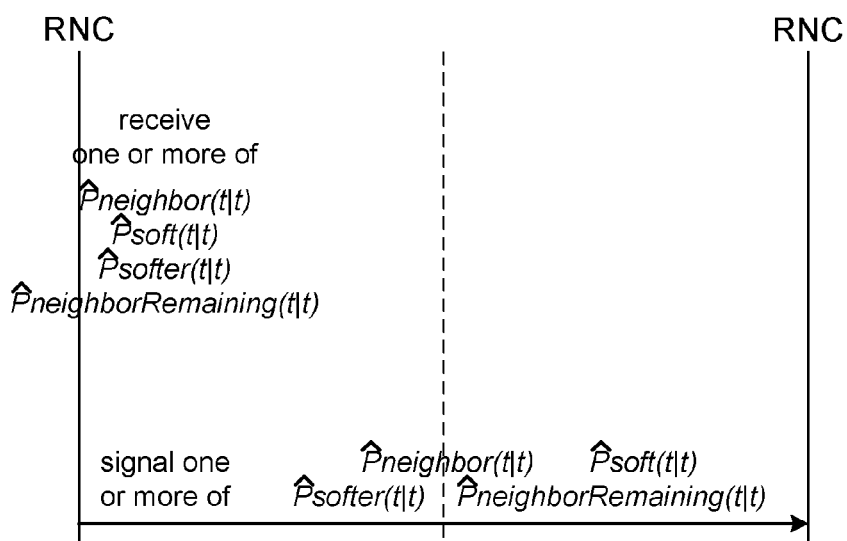
Figure 13:
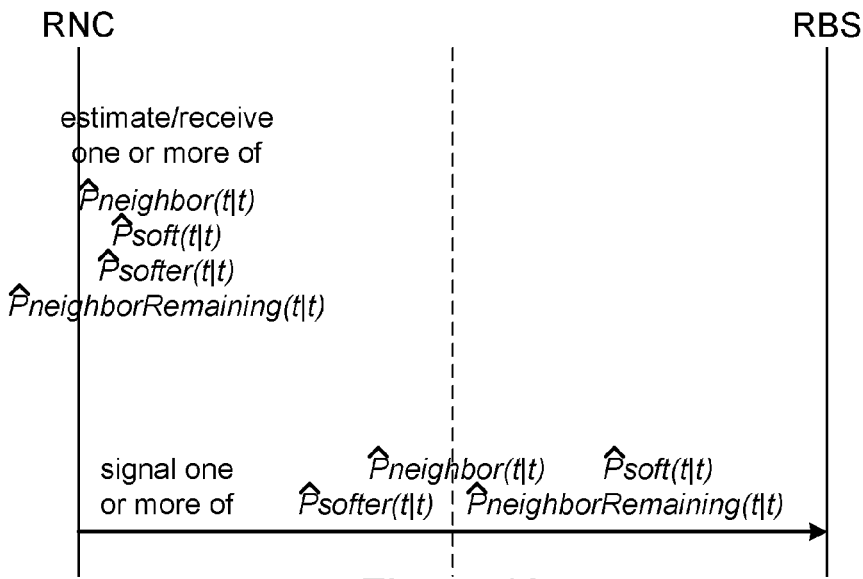
Figure 14:
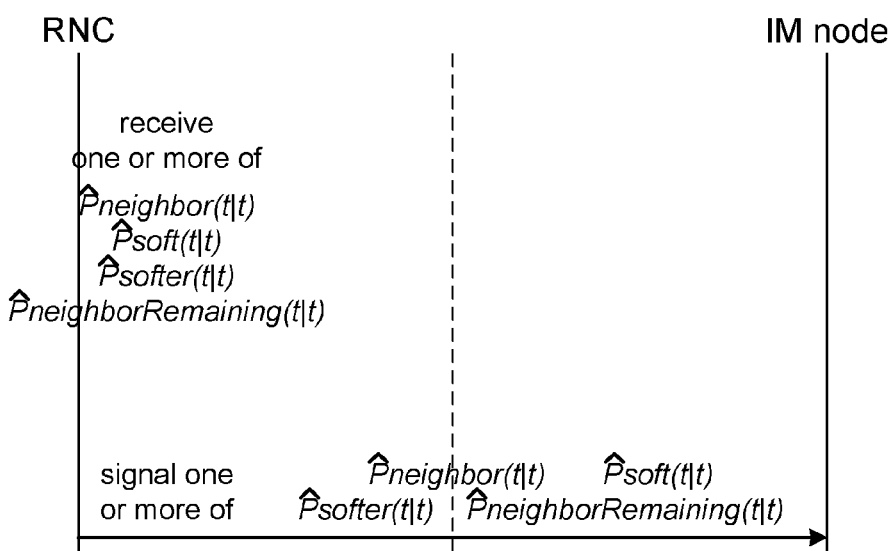

The signalling may take place between a first network node (e.g., RBS, RNC, CN node) and a second network node (e.g., another RBS, RNC, CN node, etc.). As illustrated in FIG. 8, the signalling may be over standardized interfaces (e.g., Iur, Iub, etc.) or over proprietary interfaces (Iubx). FIG. 8 shows a generic case of signalling from a first network node to a second network node. A non-exhaustive list of example signalling over standardized and/or proprietary interfaces include:
  From RBS (first network node) to a RNC (second network node) over standardized (e.g., Iub) or proprietary interface as illustrated in FIG. 9:
    The estimate(s) sent to the RNC may be estimated by the RBS or the RBS may receive the estimate(s) from another network node;
  From a RBS (first network node) to an interference management node (second network node) (e.g., RNC, RBS, CN node, etc) over standardized or proprietary interface as illustrated in FIG. 10:
    The estimate(s) sent to the interference management node may be estimated by the RBS or the RBS may receive the estimate(s) from another network node;
    Signalling from the RBS to the interference management node may be utilized in Hetnets for example;
  From a first RBS (first network node) to a second RBS (second network node) over standardized or proprietary interface as illustrated in FIG. 11:
  From a first RNC (first network node) to a second RNC (second network node) over standardized (e.g., Iur) or proprietary interface as illustrated in FIG. 12:
    The estimate(s) sent to the second RNC may be received by the first RNC from another network node;
  From a RNC (first network node) to a RBS (second network node) over standardized (e.g., Iub) or proprietary interface as illustrated in FIG. 13:
    The estimate(s) sent to the RBS may be received by the RNC from another network node;
  From a RNC (first network node) to an interference management node (second network node) (e.g., RNC, RBS, CN node, etc) over standardized or proprietary interface as illustrated in FIG. 14:
    The estimate(s) sent to the interference management node may be received by the RNC from another network node;
    Signalling from the RNC to the interference management node may be utilized in Hetnets for example.

Impact (Coupling) Factors Determination

When decisions are to be made, e.g., about interference thresholds in HetNets, the momentary impact of a scheduling decision taken in one cell on the interference level in surrounding cells should be taken into account. That is, the factors that couple the scheduling decisions taken in the cell with interferences experienced in the surrounding cells, i.e., one or more neighbor cells, should be taken into account. From the perspective of a particular cell, the impact factors may be viewed as the factors that couple scheduling decisions taken in that cell, to the interference experienced in other cells to which the coupling factors correspond. In the UL, such impact (also referred to as coupling) factor is highly time-varying since the orientation and position of the UEs can change quickly, thereby affecting antenna diagrams with respect to surrounding base station sites by tens of dBs—in fractions of a second.

By making use of the disclosed estimators, the impact factors can be computed, estimated, or otherwise determined. In one aspect, a least squares/Kalman filtering problem may be set up using quantities that are made available by the estimators. This has a number of potential advantages:
  No measurement resources are needed in the terminals. Note that continuous measurements of path-loss may be taken by the terminals in the cell in case a direct measurement approach is taken;
  No additional RRC signalling is needed—the needed information can be signalled per cell, with maximum 10 Hz, e.g., over Iub or Iur;
  The quantities processed in the network node that performs the impact factor computations may already be aggregated and subject to optimal filtering, which is likely to enhance the accuracy and bandwidth of the impact factor tracking, as compared to the case where direct path-loss measurements are used;
  The implementation of the on-line least squares solution can be performed recursively, which allows for low computational complexity and good tracking properties. An alternative is to use Kalman filtering techniques.

One implementation of the least squares processing is described as follows. Consider a cell i of a cellular network in which the set of closest cells are indexed by $\{j(i)\}$.

Applying any of the proposed estimators then allows an estimation of $\hat{P}_{neighbor, i}(t|t)$ and $\{\hat{P}_{own, j(i)}(t|t)\}$. Denoting the set of impact factors from the set of neighbor cells $\{j(i)\}$ on the interference of cell i by $\{g_{j(i)}\}$ the following equations can be written:

$$\hat{P}_{neighbor,i}(t_k \mid t_k) = \qquad (45)$$

$$\left(\hat{P}_{own,j_1(i)}(t_k \mid t_k) \ldots \hat{P}_{own,j_I(i)}(t_k \mid t_k)\right)^T \begin{pmatrix} g_{j_1(i)} \\ \vdots \\ g_{j_I(i)} \end{pmatrix} + e_i(t_k), k = 1, \ldots,.$$

In (45), I denotes the number of relevant neighbor cells of cell i, and $e_i(t_k)$ denotes the momentary error. Parameter k may be used to index the time instances when estimates are taken.

From (45), it can be seen that in order to find the impact factors $\{g_{j(i)}\}$, at least I measurements of the neighbor cell interferences need to be collected. Using 32 neighbors then requires 32 TTIs of measurements for this, which corresponds to about 64 ms. Therefore, even with the use of a factor of 10 excess measurements, it follows that the impact factors could be tracked with a bandwidth of about 1 sec with the proposed method. Accounting for the Iub BW limitation of 10 Hz, a tracking bandwidth corresponding to 1 sec should be possible with 5 excess measurements.

Note that in case soft, softer, or remaining neighbor power impact factors are requested instead, then (45) can be re-used as seen in equations (46), (47) and (48). However, the quantities should be interpreted as follows:

For softer impact factors, the set $\{g_{j(i)}\}$ contains only softer power $\hat{P}_{softer, i, j}(t|t)$ from UEs in softer handover with cell i;

$$\hat{P}_{softer,i}(t_k \mid t_k) = \qquad (46)$$

$$\left(\hat{P}_{own,softer,j_1(i)}(t_k \mid t_k) \ldots \hat{P}_{own,softer,j_I(i)}(t_k \mid t_k)\right)^T \begin{pmatrix} g_{softer,j_1(i)} \\ \vdots \\ g_{softer,j_I(i)} \end{pmatrix} + e_i(t_k),$$

$$k = 1, \ldots,$$

For soft impact factors, the set $\{g^{j(i)}\}$ contains only soft power $\hat{P}_{soft, i, j}(t|t)$ from UEs in soft handover with cell i;

$$\hat{P}_{soft,i}(t_k \mid t_k) = \qquad (47)$$

$$\left(\hat{P}_{own,soft,j_1(i)}(t_k \mid t_k) \ldots \hat{P}_{own,soft,j_I(i)}(t_k \mid t_k)\right)^T \begin{pmatrix} g_{soft,j_1(i)} \\ \vdots \\ g_{soft,j_I(i)} \end{pmatrix} + e_i(t_k), k =$$

$$1, \ldots,$$

For remaining neighbor cell interference impact factors, the set $\{g^{j(i)}\}$ contains only remaining neighbor interference power $\hat{P}_{neighborRemaining}(t|t)$ from UEs not in soft or softer handover with cell i;

$$\hat{P}_{neighbor,remaining,i}(t_k \mid t_k) = \qquad (48)$$

$$\left(\hat{P}_{own,remaining,j_1(i)}(t_k \mid t_k) \ldots \hat{P}_{own,remaining,j_I(i)}(t_k \mid t_k)\right)^T$$

$$\begin{pmatrix} g_{remaining,j_1(i)} \\ \vdots \\ g_{remaining,j_I(i)} \end{pmatrix} + e_i(t_k), k = 1, \ldots,.$$

In (46)-(48) $\hat{P}_{softer, i}(t_k|t_k)$ is the experienced softer power in cell i due to softer power transmission $\hat{P}_{own, softer, j(i)}(t_k|t_k)$ in the surrounding cells j(i) and $g_{softrer, j_m(i)}$ is the corresponding coupling factor component. Further $\hat{P}_{soft, i}(t_k|t_k)$ is the experienced soft power in cell i due to soft power transmission $\hat{P}_{own, soft, j(i)}(t_k|t_k)$ in the surrounding cells j(i) and $g_{soft, j_m(i)}$ is the corresponding coupling factor component. Still further, $\hat{P}_{remaining, i}(t_k|t_k)$ is the experienced remaining neighbor power in cell i due to remaining neighbor power transmission $\hat{P}_{own,remaining, j(i)}(t_k|t_k)$ in the surrounding cells j(i) and $g_{remaining, j_m(i)}$ is the corresponding coupling factor component. To use (45)-(45c), a least squares or Kalman filter setting to solve (45) may be employed. The complexity of the proposed method is very low.

Impact Factors Based Scheduling

It is seen that it would also be desirable to have an ability to predict how a scheduling decision and an associated interference will impact neighbor cells. Note this is not the same as estimating the neighbor cell interference experienced in a certain cell. The following is a non-exhaustive list of impact factor based scheduling:

Scheduling based on estimated softer handover impact factors, e.g., allowing the scheduler to control its interference on users in other neighbor cells in softer handovers;

Scheduling based on estimated soft handover impact factors, e.g., allowing the scheduler to control its interference on users in other neighbor cells in soft handovers;

Scheduling based on estimated remaining neighbor cell interference impact factors, e.g., allowing the scheduler to control its interference on users in other neighbor cells not in either the soft or softer handovers.

Figure 15:
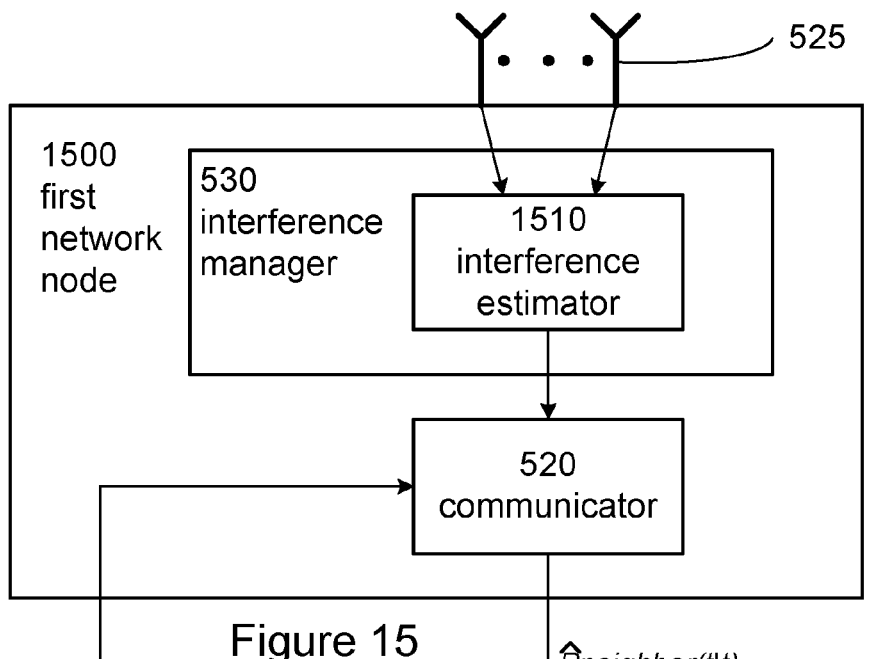
FIGS. 15 and 16 illustrate example apparatuses structured to implement an impact factors based scheduling.
Figure 16:
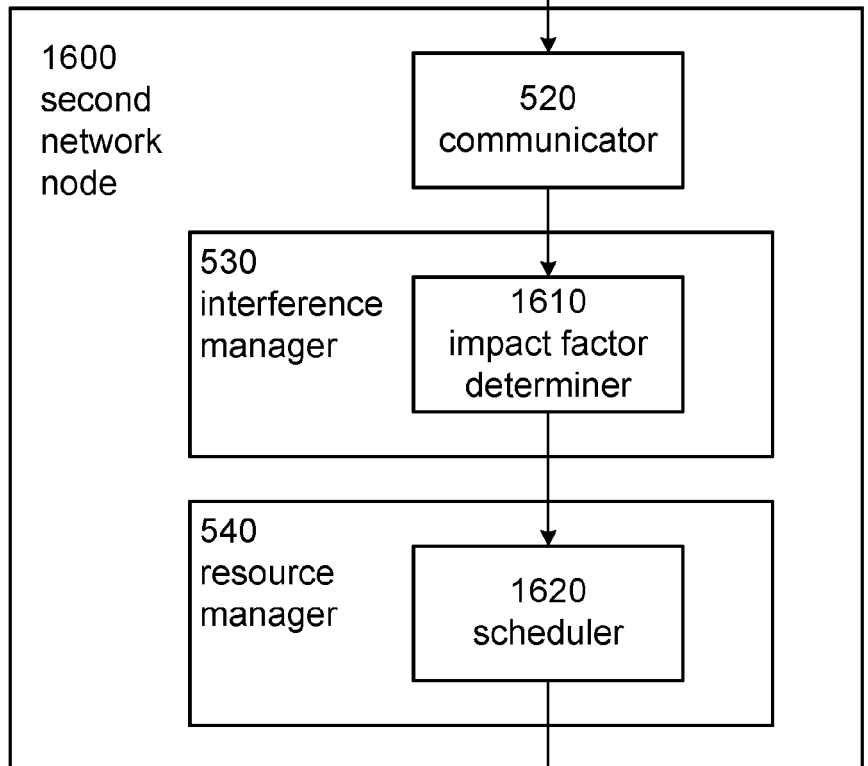

Example apparatuses that may be structured to implement the impact based scheduling functionalities are depicted in FIGS. 15 and 16 and are respectively labelled as first and second network nodes 1500, 1600. One or both of the first and second network nodes 1500, 1600 may be structured as the network node 500 illustrated in FIG. 5. That is, one or both of the first and second network nodes 1500, 1600 may be a radio network node 310, 315, a network node 340, or a core network node.

In the first network node 1500, the interference manager 530 may include an interference estimator 1510 structured to estimate or otherwise determine one or more interference related quantities. In the second network node 1600, the interference manager 530 may include an impact factor determiner 1610 structured to determine one or more impact factors, and the resource manager 540 may include a scheduler 1620 structured to allocate radio resources to UEs in one or more cells. For example, the second network node 1600 may be a radio base station 310 or a radio network controller 340.

So as to reduce clutter, not all devices of the network node 500 are reproduced in FIGS. 15 and 16. It should be noted that a network node 500 may perform the role of the first network node 1500 and/or the role of the second network node 1600. In other words, a network node 500 may include any of the interference estimator 1510, the impact factor determiner 1610 and the scheduler 1620.

Figure 17:
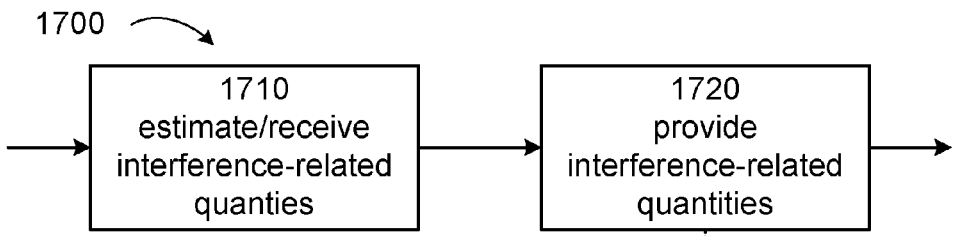
FIGS. 17 and 18 illustrate a flow chart of an example method performed by network nodes to implement an impact factors based scheduling.
Figure 18:
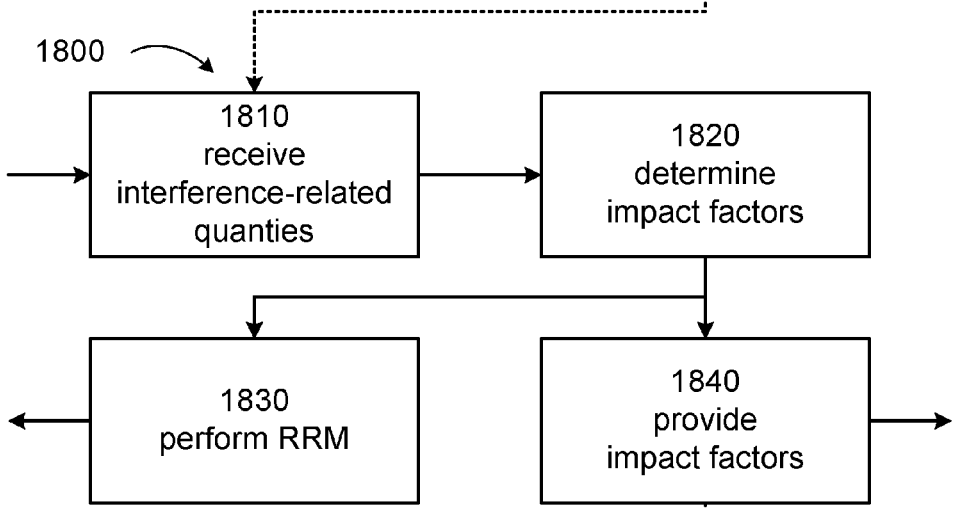

FIGS. 17 and 18 illustrate a flow chart of an example method to performed by the first and second network nodes 1500, 1600 to implement the impact factors based scheduling. The process 1700 illustrated in FIG. 17 is assumed to be performed by the first network node 1500 and the process 1800 illustrated in FIG. 18 is assumed to be performed by the second network node 1600. The first and second network nodes 1500, 1600 may respectively correspond to left and right network nodes illustrated in FIGS. 8-14.

Note that in order to estimate or otherwise determine the impact (or coupling) factors, it may be necessary to provide one or both of the following information to an impact factor computing node (e.g., RBS, RNC):

An estimate of the experienced neighbor cell interference power in a specific cell, for a sequence of time instances;

Estimates of the own cell interference estimated in surrounding cells and/or RBSs (i.e., interference transmitted from surrounding cells), for the same sequence of time instances.

Preferably, this information is signalled continuously.

The impact factors estimation and signalling of the impact factors allow the scheduler 1620 to make more refined scheduling decisions relative to conventional scheduling techniques. The disclosed mechanism can reduce soft and/or softer interferences for all UEs in a certain cell that interfere too much.

In step 1710, the interference estimator 1510 of the first network node 1500 may estimate or otherwise determine one or more interference-related quantities, e.g., one or more of $\hat{P}_{own}(t|t)$, $\hat{P}_{neighbor}(t|t)$, $\hat{P}_{softer, i, j}(t|t)$, $\hat{P}_{soft, i, j}(t|t)$, and $\hat{P}_{neighborRemaining}(t|t)$. To perform this step, the first network node 1500 may receive the interference-related quantities from another network node.

But in another way, the first network node 1500 may determine these quantities on its own. FIG. 33 illustrates a flow chart of a process performed by the first network node 1500 to implement step 1710. As seen, in step 3310, the interference manager 530 may obtain the neighbor cell interference estimate $\hat{P}_{neighbor}(t|t)$. For example, the interference manager 530 may perform the process 3400 illustrated in FIG. 34. That is, the interference manager 530 may estimate the neighbor cell interference based on measured load and/or received total wideband power. In step 3320, interference manager 530 may obtain one or more of the softer interference estimate $\hat{P}_{softer, i, j}(t|t)$ (see equation (42)), soft interference estimate $\hat{P}_{soft, i, j}(t|t)$ (see equation (43)), and remaining neighbor cell interference estimate $\hat{P}_{neighborRemaining}(t|t)$ (see equation (44)). For example, the soft and softer interferences may be estimated and the results may be subtracted from the neighbor cell interference estimate.

Referring back to FIG. 17, in step 1720, the estimated and/or received interference-related quantities may be signaled by the communicator 520 to the second network node 1600. Note that the first network node 1500 may signal the interference-related quantities to multiple second network nodes 1600.

In step 1810, the interference-related quantities signaled from the first network node 1500 may be received by the communicator 520 of the second network node 1600. It should be noted that in step 1810, the interference related quantities may be received from one or several first network nodes 1500. In step 1820, the impact factor determiner 1610 may estimate or otherwise determine the impact factors $\{g^{j(i)}\}$ based on the interference-related quantities received from the one or multiple first network nodes 1500. See e.g., equation (45). The impact factor determiner 1610 may also determine the softer impact factors $\{g_{softer, j(i)}\}$ (see equation (46)), the soft impact factors $\{g_{soft, j(i)}\}$ (see equation (47)) and/or remaining neighbor cell interference impact factors $\{g_{remaining, j(i)}\}$ (see equation (48)).

In step 1830, the radio resource manager 540 may perform a RRM (radio resource management) function. For example, the scheduler 1620 may schedule resource grants based on the impact factors. It should be noted that scheduling of radio resources is not the only RRM function that may be performed by the radio resource manager 540. Some of the other RRM functions that may be performed by the second network node 1600 or other RRM node are described in further detail below.

Other Radio Resource Management

In an aspect, some or all impact factors may be made available or otherwise distributed to perform radio resource management (RRM) functions. As seen above, the second network node 1600 may perform one or more RRM functions. But as an alternative or in addition thereto, the second network node 1600 may make the impact factors available to a RRM node structured to perform one or more RRM functions. Referring back to FIG. 18, in step 1840, the communicator 520 of the second network node 1600 may provide the impact factors to a RRM node.

Figure 19:
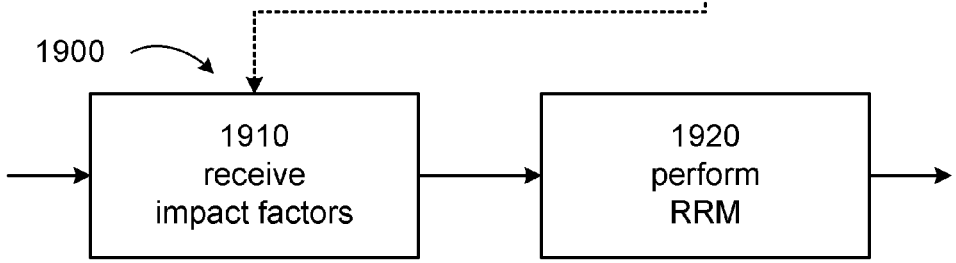
FIG. 19 illustrates a flow chart of an example method performed by a RRM node to manage radio resources.

FIG. 19 illustrates a flow chart of an example method of the RRM node to manage radio resources. In step 1910, the impact factors signaled from the second network node 1600 may be received by the communicator 520 of the RRM node.

Figure 20:
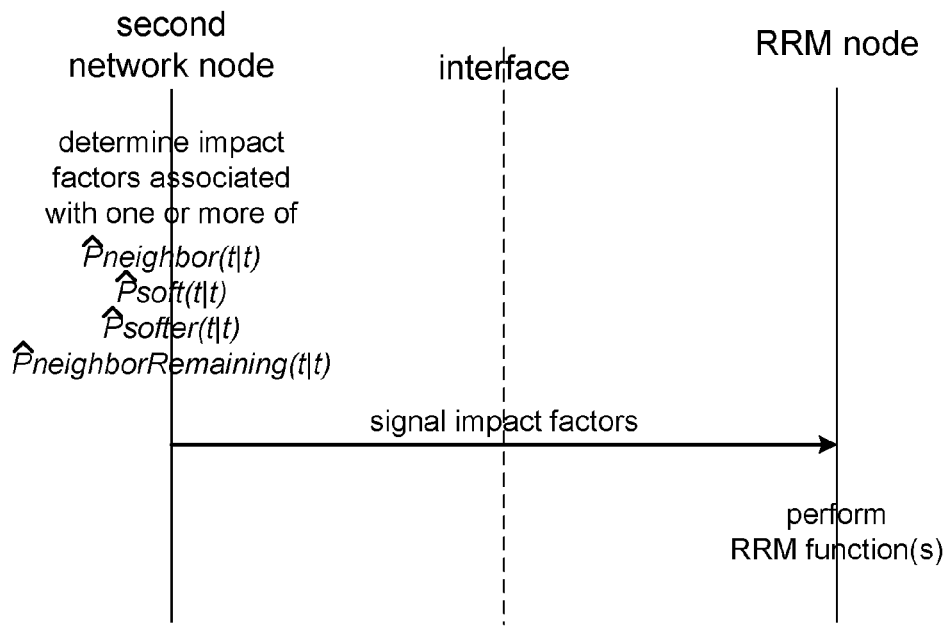
FIG. 20 illustrates an example of impact factor signalling between a network node and a radio resource management node enable radio resource management functions to be performed.

FIG. 20 illustrates signalling between the second network node 1600 and the RRM node to distribute impact/coupling factors. Much like the signalling between the first and second network nodes 1500, 1600, the impact factor signalling may also be over standardized and/or proprietary interfaces.

In step 1920, the resource manager 540 may perform one or more RRM functions based on the received impact factors. Examples of RRM functions include scheduling of radio resources (discussed above), (centralized) power control, admission control, congestion control, connection capability, RAB reconfiguration, mobility management and SON functionality (e.g., cell planning). Note that the resource manager 540 of the second network node 1600 may also perform one or more of the RRM functions.

Impact Factors Based Power Control

Impact factors may be made available to an outer loop power control algorithm. As an example, it may be possible to reduce the SIR target of the high connections of a cell, in case impact factors would be too high for a short period with respect to a neighbor cell. Hence a higher block error would then be accepted and perhaps a slightly lower rate, without the need of a rate change. This follows since a reduced SIR target would lead to transmission with a worse signal to noise ratio. That in turn means that the bit and block error rates will increase. However, that can be mitigated by the use of re-transmissions that is a useful option in the WCDMA UL. The following is a non-exhaustive list of impact factor based power control (e.g., centralized power control) examples:

Power control for users in an own cell based on estimated softer impact factors, e.g., allowing the power control loops to control the interference also on users in neighbor cells in softer handovers;

Power control for users in an own cell based on estimated soft impact factors, e.g., allowing the power control loops to control the interference also on users in neighbor cells in soft handovers;

Power control based on estimated remaining neighbor cell interference impact factors, e.g., allowing the power control loops to control the interference also on users in neighbor cells not in soft or softer handovers.

Figure 21:
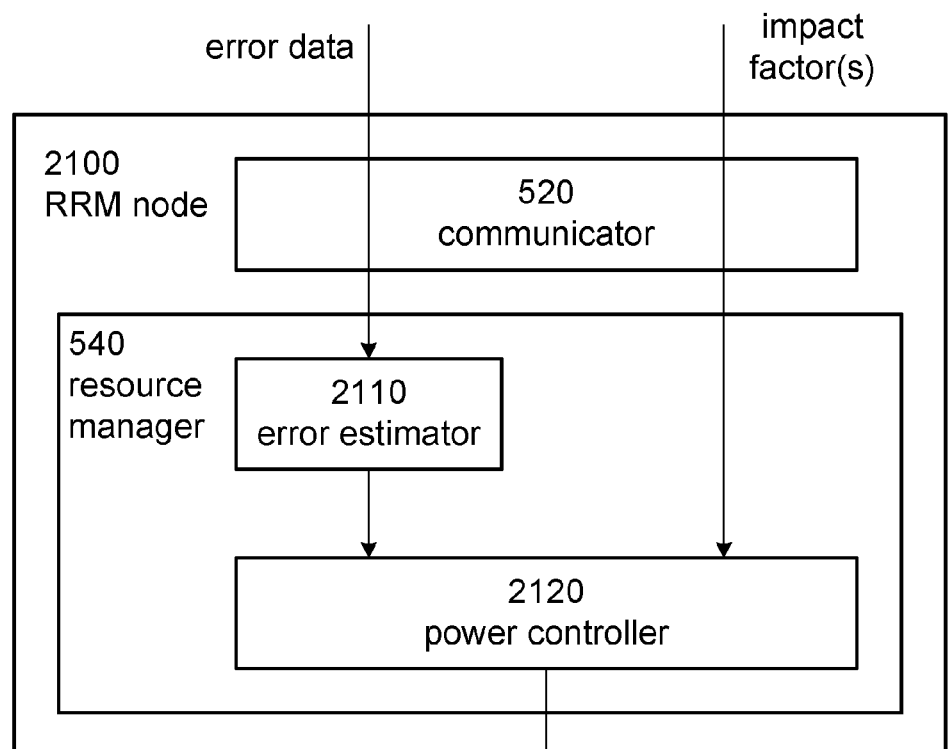
FIGS. 21 and 22 respectively illustrate an embodiment of a radio resource management node and a flow chart of a process performed by the radio resource management node to perform an impact factors based power control.

An example RRM node 2100 that may be structured to implement impact factors based power control is depicted in FIG. 21. The RRM node 2100 may be structured as the network node 500 illustrated in FIG. 5, i.e., the RRM node 2100 may be an RBS, RNC, CN node, or similar. In FIG. 21 as well as other examples of the RRM nodes that follow, the resource manager 540 is elaborated. So as to reduce clutter, not all devices of the network node 500 are reproduced. As seen, the resource manager 540 may include an error estimator 2110 and a power controller 2120.

Figure 22:
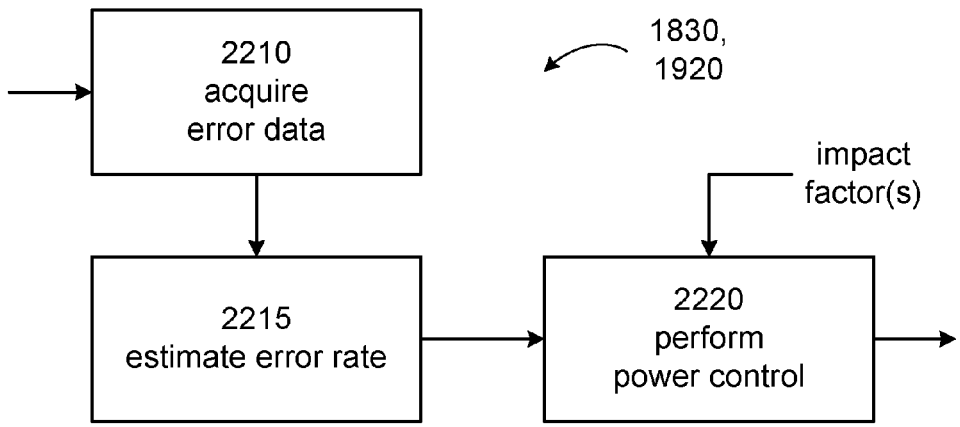

FIG. 22 illustrates a flow chart of an example process performed by the resource manager 540 to implement step 1920 (or step 1830), which in this instance is to perform power control. As seen, in step 2210, the error estimator 2110 may acquire error data, e.g., via the communicator 520. For example, a network node such as an RBS may provide block error rate or bit error rate it is experiencing to the error estimator 2110 of the RNC. In step 2215, the error estimator 2110 may estimate the error rate. In step 2220, the power controller 2120 may perform power control based on the estimated error rate and the received impact factors. For example, the power controller 2120 may set the SIR target based at least on the impact factors.

Impact Factors Based Admission Control

Admission control provides high level interference control in the RNC. It is the only way to provide interference control for release 99 (R99) traffic. In one or more aspects, admission control may make use of the impact factors in a way similar to the scheduling mechanism—by avoiding admissions to a cell that could cause much neighbor cell interference, e.g., over a certain threshold. Such functionality may require signalling of impact factors from the node where they are determined, to the RNC.

Figure 23:
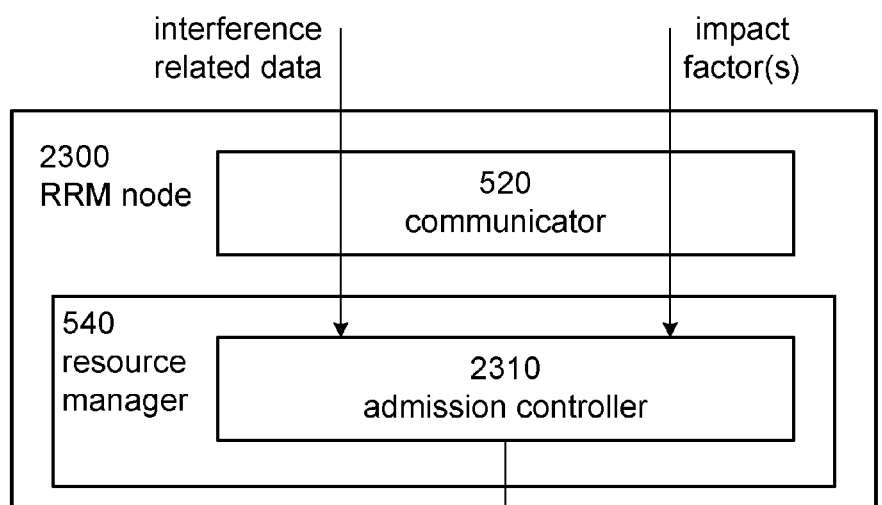
FIGS. 23 and 24 respectively illustrate an embodiment of a radio resource management node and a flow chart of a process performed by the radio resource management node to perform an impact factors based admission control.
Figure 24:
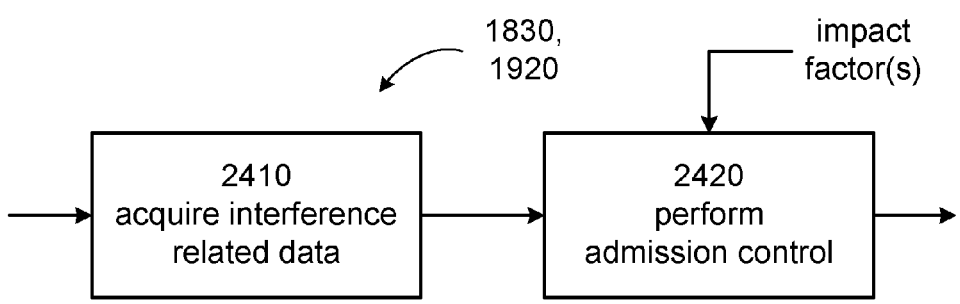

An example RRM node 2300 that may be structured to implement impact factors based admission control is depicted in FIG. 23. As seen, the resource manager 540 of the RRM node 2300 may include an admission controller 2310. FIG. 24 illustrates a flow chart of an example process performed by the resource manager 540 to implement step 1920 (or step 1830), which in this instance is to perform admission control. As seen, in step 2410, the admission controller 2310 may acquire interference related data, e.g., via the communicator 520. For example, a RNC may acquire load experienced by a RBS. In step 2420, the admission controller 2310 may perform admission control based on the acquired interference related data and the received impact factors. For example, the admission controller 2310 may make admission decisions based at least on the impact factors.

Impact Factors Based Congestion Control

A similar principle may also govern congestion control functions, where removal of users in a cell may mitigate a severe interference situation in another cell. Again, signalling of impact factors from the node where they are determined to the RNC may be necessary. This functionality may also require signalling of impact factors from the node where they are determined, to the RNC.

Figure 25:
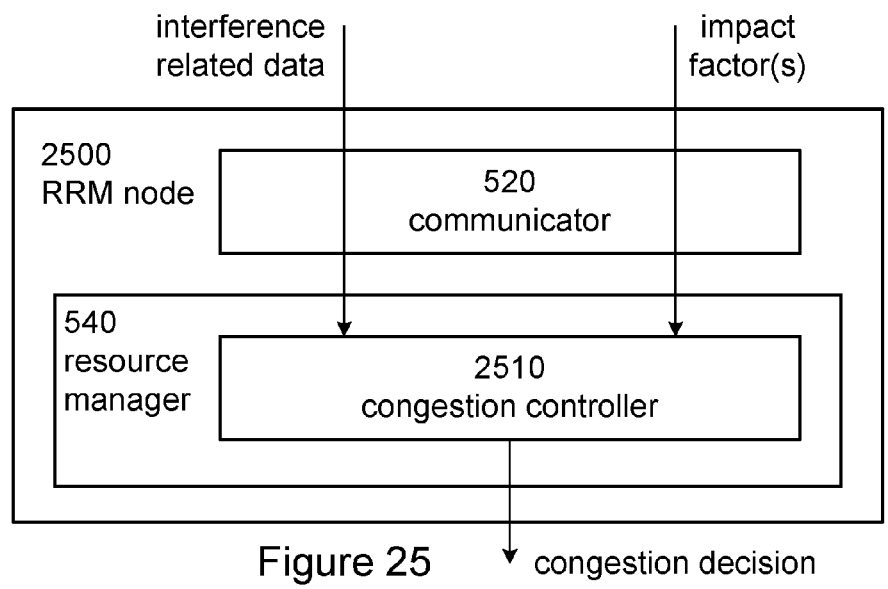
FIGS. 25 and 26 respectively illustrate an embodiment of a radio resource management node and a flow chart of a process performed by the radio resource management node to perform an impact factors based congestion control.
Figure 26:
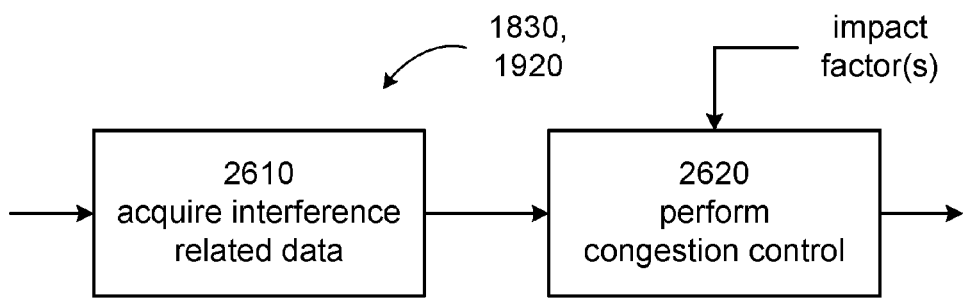

An example RRM node 2500 that may be structured to implement impact factors based congestion control is depicted in FIG. 25. As seen, the resource manager 540 of the RRM node 2500 may include a congestion controller 2510. FIG. 26 illustrates a flow chart of an example process performed by the resource manager 540 to implement step 1920 (or step 1830), which in this instance is to perform congestion control. As seen, in step 2610, the congestion controller 2510 may acquire interference related data, e.g., via the communicator 520. In step 2620, the congestion controller 2510 may perform congestion control based on the acquired interference related data and the received impact factors. For example, the congestion controller 2510 may make congestion decisions based at least on the impact factors.

Impact Factors Based RAB Reconfiguration

Radio access bearer reconfiguration handles radio access bearer changes such as changes of rates. Since rates are strongly correlated to interference generation, RAB reconfiguration in this respect could also be used for regulation of interference. With high quality estimated impact factors available, it becomes possible to use RAB reconfiguration to increase/decrease traffic also accounting for the impact on neighbor cells. The possibility to split the factors into softer, soft and remaining neighbor impact factors, provides opportunities to finely regulate the interference generated.

Figure 27:
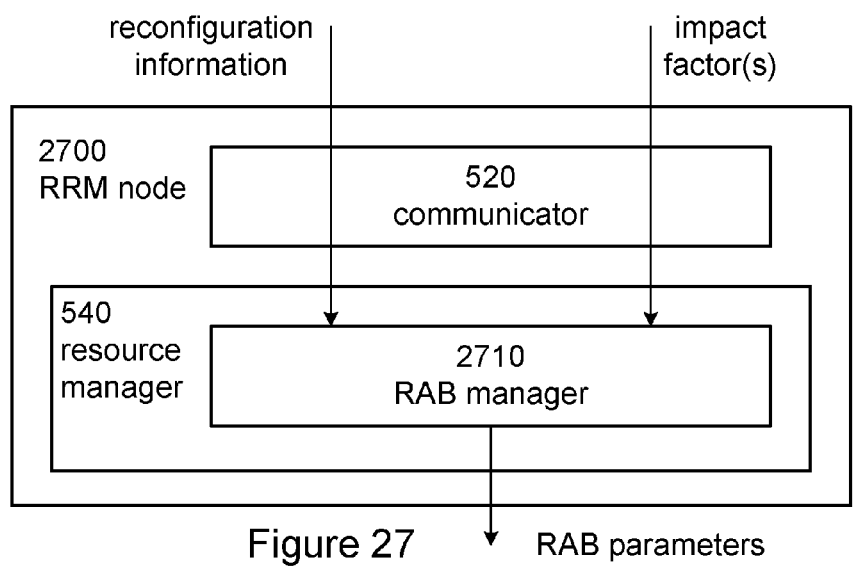
FIGS. 27 and 28 respectively illustrate an embodiment of a radio resource management node and a flow chart of a process performed by the radio resource management node to perform an impact factors based radio access bearer reconfiguration.
Figure 28:
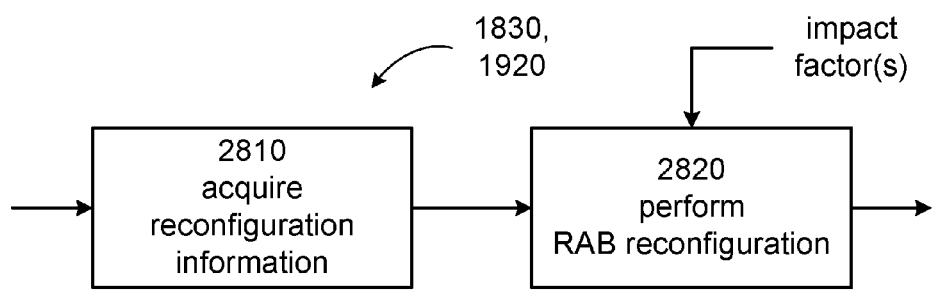

An example RRM node 2700 that may be structured to implement impact factors based RAB reconfiguration is depicted in FIG. 27. As seen, the resource manager 540 of the RRM node 2700 may include a RAB manager 2710. FIG. 28 illustrates a flow chart of an example process performed by the resource manager 540 to implement step 1920 (or step 1830), which in this instance is to perform RAB reconfiguration. As seen, in step 2810, the RAB manager 2710 may acquire reconfiguration information, e.g., via the communicator 520. In step 2820, the RAB manager 2710 may perform RAB reconfiguration based on the acquired reconfiguration information and the received impact factors. For example, the RAB manager 2710 may set new RAB parameters based at least on the impact factors.

Impact Factors Based Mobility Management

In systems such as WCDMA, soft and softer handover are important. In softer handover between cells of the same RBS, transmissions between the UE and each cell can be softly combined. In soft handover between cells in different RBSs, a hard decision between the radio links of the different cells is made instead. The decision to initiate a soft or softer handover is governed by certain events that compare, e.g., estimated signal to interference ratios to thresholds. Standard signal processing tools like hysteresis is used to avoid chattering. Similar events are used to initiate a change of the serving cell in HSPA when required.

With the availability of high fidelity estimated impact factors, new possibilities open up. As an example, asymmetry may occur for the impact factors in a sense that two cells in soft handover may have mutual coupling factors of different sizes. In such cases, it may be advantageous to perform a serving cell change to the other cell, to decrease the generated interference.

Figure 29:
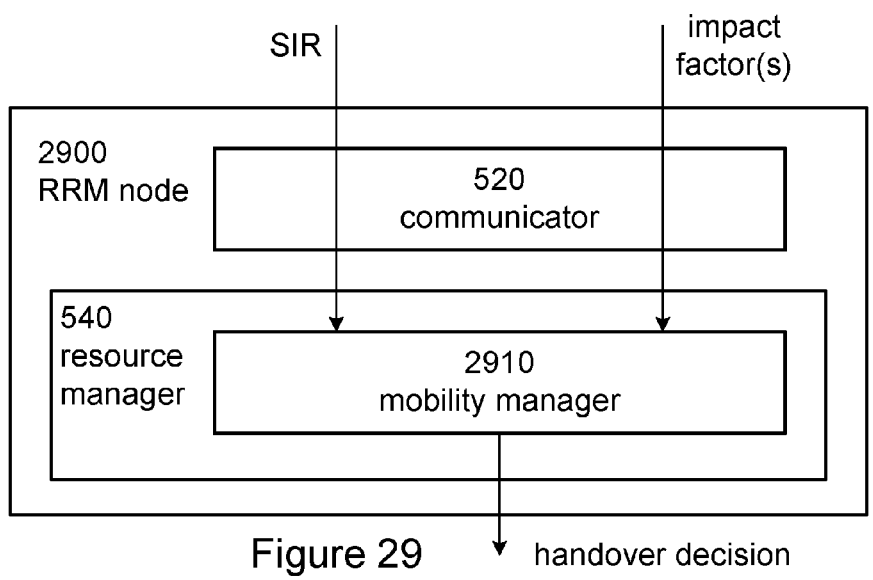
FIGS. 29 and 30 respectively illustrate an embodiment of a radio resource management node and a flow chart of a process performed by the radio resource management node to perform an impact factors based mobility management.
Figure 30:
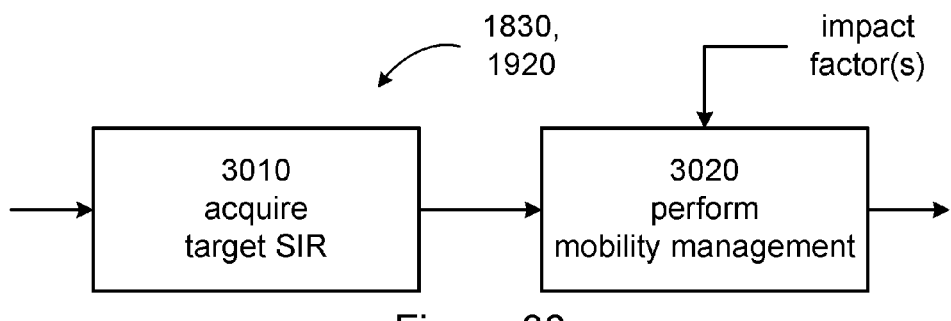

An example RRM node 2900 that may be structured to implement impact factors based mobility management is depicted in FIG. 29. As seen, the resource manager 540 of the RRM node 2900 may include a mobility manager 2910. FIG. 30 illustrates a flow chart of an example process performed by the resource manager 540 to implement step 1920 (or step 1830), which in this instance is to perform mobility management. As seen, in step 3010, the mobility manager 2910 may acquire a target SIR, e.g., via the communicator 520. In step 3020, the mobility manager 2910 may perform mobility management based on the acquired target SIR and the received impact factors. For example, the mobility manager 2910 may make handover decisions based at least on the impact factors.

Impact Factors Based Cell Planning

Cell planning is an activity where automation has been a desire for many years. With HetNets, the need for automatic adaptation of cell plans is expected to grow enormously. Adaptation to achieve such self-organizing network (SON) functionality would benefit largely from availability of the impact factors.

The cell planning field includes numerous set of methods and algorithms. A very important cell planning aspect is the interference. In one or more aspects, automation of the cell planning process is achieved through, among others, any one or more of the following:

On-line estimation of neighbor cell interferences, allowing also this interference to be split into softer, soft and remaining neighbor cell interference power;

Signalling of these quantities, together with own cell powers;

Estimation of impact/coupling factors corresponding to the above interference powers;

Signalling of the impact factors from the impact factor estimation nodes to SON nodes; and Adaptive interference planning in the SON nodes.

Figure 31:
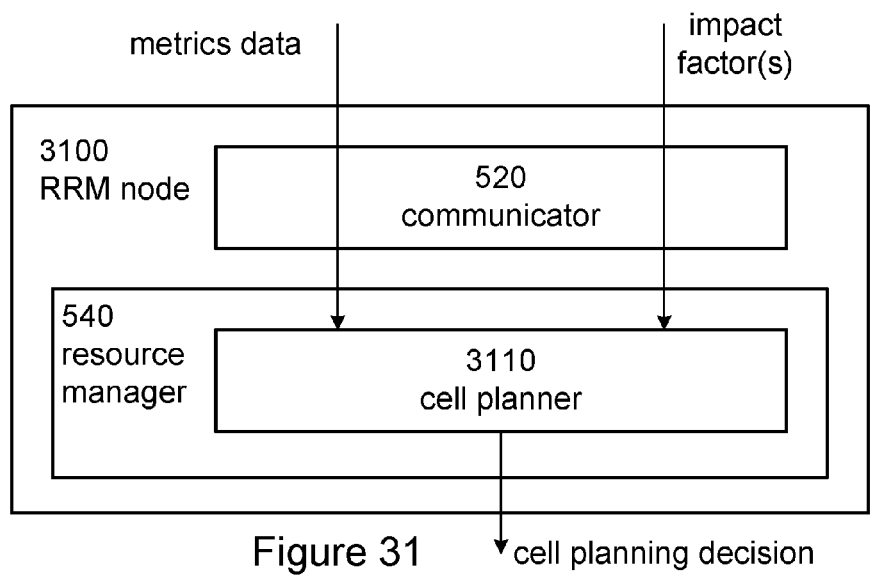
FIGS. 31 and 32 respectively illustrate an embodiment of a radio resource management node and a flow chart of a process performed by the radio resource management node to perform an impact factors based cell planning.
Figure 32:
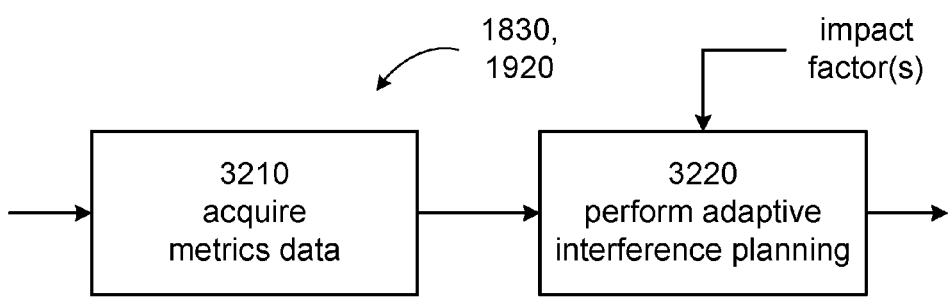

An example RRM node 3100 that may be structured to implement impact factors based cell planning is depicted in FIG. 31. In one embodiment, the RRM node 3100 may be a SON node. As seen, the resource manager 540 of the RRM node 3100 may include a cell planner 3110. FIG. 32 illustrates a flow chart of an example process performed by the resource manager 540 to implement step 1920 (or step 1830), which in this instance is to perform adaptive interference planning. As seen, in step 3210, the cell planner 3110 may acquire metrics data, e.g., via the communicator 520. For example, the cell planner 3110 may acquire radio quality metric(s). In step 3220, the cell planner 3110 may perform adaptive interference planning based on the acquired metrics data and the received impact factors. For example, the cell planner 3110 may make cell planning decisions based at least on the impact factors.

It should be noted that a network node 500 may perform the role of any one or more of the RRM nodes 2100, 2300, 2500, 2700, 2900, 3100. In other words, a network node 500 may include any one or more of the error estimator 2110, power controller 2120, admission controller 2310, congestion controller 2510, RAB manager 2710, mobility manager 2910 and cell planner 3110.

A non-exhaustive list of advantages of one or more aspects of the disclosed subject matter include:

Improved interference management and reduced interference impairments in HetNets, through enhanced possibilities for fine control of the interference situation, in particular by scheduling accounting for (among others):

Estimated softer handover impact factors;
Estimated soft handover impact factors;
Estimated remaining neighbor cell interference impact factors;

Improved RRM functionality resulting from the refined estimates of neighbor cell interference, divided in soft, softer and remaining power, and estimated impact factors, including improved:

(Centralized) power control;
Admission control;
Congestion control;
RAB reconfiguration;

Self organizing network functionality like cell planning, using pilot signal settings, antenna directions and tilts, etc, to affect coverage;

Enhanced capacity and performance cellular network, and in HetNet situations in particular.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a first network node corresponding to a cell of interest in a wireless network, the method comprising:

estimating a neighbor cell interference estimate $\hat{P}_{neighbor}(t)$ based on one or both of a measured load $\overline{L}_{own}(t)$ and a total wideband power $P_{RTWP}(t)$;

obtaining one or more of a soft interference estimate $\hat{P}_{soft}(t)$, a softer interference estimate $\hat{P}_{softer}(t)$, and a remaining neighbor interference estimate $\hat{P}_{neighborRemaining}(t)$, based on the neighbor cell interference estimate $\hat{P}_{neighbor}(t)$;

determining one or more interference-related quantities, the one or more interference-related quantities comprising the soft interference estimate $\hat{P}_{soft}(t)$, the softer interference estimate $\hat{P}_{softer}(t)$, the remaining neighbor interference estimate $\hat{P}_{neighborRemaining}(t)$, and the neighbor cell interference estimate $\hat{P}_{neighbor}(t)$, wherein the measured load $\overline{L}_{own}(t)$ represents resource grants used at time t by one or more cell terminals in the cell of interest and the total wideband power $P_{RTWP}(t)$ represents a total power received in the cell of interest at the time t, wherein the neighbor cell interference estimate $\hat{P}_{neighbor}(t)$ represents an estimate of a neighbor cell interference $P_{neighbor}(t)$ which expresses a sum of interferences present in the cell of interest due to wireless activities applicable at the time t in one or more cells other than in the cell of interest, wherein the soft interference estimate $\hat{P}_{soft}(t)$ represents an estimate of a soft interference $P_{soft}(t)$ which expresses a sum of interferences present in the cell of interest due to soft handovers applicable at the time t of one or more terminals into or out of the cell of interest, wherein the softer interference estimate $\hat{P}_{softer}(t)$ represents an estimate of a softer interference $P_{softer}(t)$ which expresses a sum of interferences present in the cell of interest due to softer handovers applicable at the time t of the one or more terminals into or out of the cell of interest, and wherein the remaining neighbor interference estimate $\hat{P}_{neighborRemaining}(t)$ represents an estimate of a remaining neighbor interference $P_{neighborRemaining}(t)$ which expresses a sum of interferences, present in the cell of interest due to the wireless activities applicable at the time t in the one or more cells other than in the cell of interest, other than the soft interference $P_{soft}(t)$ and the softer interference $P_{softer}(t)$;

determining one or more interference impact factors based on the determined one or more interference-related quantities; and performing a radio resource management (RRM) function based at least on the determined one or more interference-related quantities so as to control interferences experienced in the one or more cells other than in the cell of interest.

2. The method of claim 1, wherein the step of obtaining the one or more of the soft interference estimate $\hat{P}_{soft}(t)$, the softer interference estimate $\hat{P}_{softer}(t)$, and the remaining neighbor interference estimate $\hat{P}_{neighborRemaining}(t)$ based on the neighbor cell interference estimate $P_{neighbor}(t)$ comprises:

obtaining the soft interference estimate $\hat{P}_{soft}(t)$ based on load factors of the one or more terminals involved in the soft handovers into or out of the cell of interest;

obtaining the softer interference estimate $\hat{P}_{softer}(t)$ based on the load factors of the one or more terminals involved in the softer handovers into or out of the cell of interest; and obtaining the remaining neighbor interference estimate $\hat{P}_{neighborRemaining}(t)$ based on the neighbor cell interference estimate $\hat{P}_{neighbor}(t)$, the soft interference estimate $\hat{P}_{soft}(t)$, and the softer interference estimate $\hat{P}_{softer}(t)$.

3. The method of claim 1, wherein the method further comprises:

signaling the determined one or more interference-related quantities to a second network node over an interface, wherein the interface used by the first network node for the signaling comprises one or more of Iub, Iur, and Iubx interface; and signaling at least one of the neighbor cell interference estimate $\hat{P}_{neighbor}(t)$, the soft interference estimate $\hat{P}_{soft}(t)$, the softer interference estimate $\hat{P}_{softer}(t)$, and the remaining neighbor interference estimate $\hat{P}_{neighborRemaining}(t)$ to the second network node over the interface.

4. A method performed at a second network node of a wireless network, the method comprising:

obtaining one or more interference-related quantities from one or more first network nodes;

determining one or more interference impact factors based on the obtained one or more interference related quantities from the one or more first network nodes, wherein for each first network node, the one or more interference-related quantities comprise one or more of: a neighbor cell interference estimate $\hat{P}_{neighbor}(t)$, a soft interference estimate $\hat{P}_{soft}(t)$, a softer interference estimate $\hat{P}_{softer}(t)$ and a remaining neighbor interference estimate $\hat{P}_{neighborRemaining}(t)$, wherein for each first network node, the neighbor cell interference estimate $\hat{P}_{neighbor}(t)$ represents an estimate of a neighbor cell interference $P_{neighbor}(t)$ which expresses a sum of interferences present in a cell of interest corresponding to the first network node due to wireless activities applicable at time t in one or more cells other than in the cell of interest of the first network node, wherein for each first network node, the soft interference estimate $\hat{P}_{soft}(t)$ represents an estimate of a soft interference $P_{soft}(t)$ which expresses a sum of interferences present in the cell of interest corresponding to the first network node due to soft handovers applicable at the time t of one or more terminals into or out of the cell of interest of the first network node, wherein for each first network node, the softer interference estimate $\hat{P}_{softer}(t)$ represents an estimate of a softer interference $P_{softer}(t)$ which expresses a sum of interferences present in the cell of interest corresponding to the first network node due to softer handovers applicable at the time t of the one or more terminals into or out of the cell of interest of the first network node, wherein for each first network node, the remaining neighbor interference estimate $\hat{P}_{neighborRemaining}(t)$ represents an estimate of a remaining neighbor interference $P_{neighborRemaining}(t)$ which expresses a sum of interferences, present in the cell of interest corresponding to the first network node due to the wireless activities applicable at the time t in the one or more cells other than in the cell of interest of the first network node, other than the soft interference $P_{soft}(t)$ and the softer interference $P_{softer}(t)$, and wherein the one or more interference impact factors represent factors that couple scheduling decisions taken in one cell with interferences experienced in one or more neighbor cells; and performing a radio resource management (RRM) function based at least on the determined one or more interference impact factors so as to control interferences experienced in the one or more cells other than in the cell of interest.

5. The method of claim 4, wherein the step of obtaining the one or more interference-related quantities from the one or more first network nodes comprises:

for each first network node, receiving at least one of the neighbor cell interference estimate $\hat{P}_{neighbor}(t)$, the soft interference estimate $\hat{P}_{soft}(t)$, the softer interference estimate $\hat{P}_{softer}(t)$, and the remaining neighbor interference estimate $\hat{P}_{neighborRemaining}(t)$ from the first network node over an interface.

6. The method of claim 4, wherein the step of determining the one or more interference impact factors based on the obtained one or more interference-related quantities from the one or more first network nodes comprises:

for at least one cell i represented in the one or more interference-related quantities, obtaining a set of impact factors $\{g_{j(i)}\}$ from a set of cells $\{j(i)\}$ neighboring the cell i based on the one or more interference-related quantities.

7. The method of claim 6, wherein the step of obtaining the set of impact factors $\{g_{j(i)}\}$ comprises obtaining at least one of soft impact factors $\{g_{soft, j(i)}\}$, softer impact factors $\{g_{softer, j(i)}\}$, and remaining neighbor cell interference impact factors $\{g_{remaining, j(i)}\}$, wherein the soft impact factors $\{g_{soft, j(i)}\}$ couple contributions to an interference experienced at the cell i from the one or more neighbor cells due to soft handovers of terminals into or out of the cell i, wherein the softer impact factors $\{g_{softer, j(i)}\}$ couple contributions to the interference experienced at the cell i from the one or more neighbor cells due to softer handovers of the terminals into or out of the cell i, and wherein the remaining neighbor cell interference impact factors $\{g_{remaining, j(i)}\}$ couple contributions to the interference experienced at the cell i, from the one or more neighbor cells due to activities of the terminals in the cell i, not in the soft or softer handovers.

8. The method of claim 4, wherein the step of performing the RRM function comprises one or more of:

scheduling radio sources for a terminal in a cell based at least on the one or more interference impact factors, performing a power control of the terminal in the cell based at least on the one or more interference impact factors, performing an admission control to decide whether or not to admit the terminal in the cell based at least on the one or more interference impact factors, performing a congestion control to decide whether or not to remove the terminal from being connected to the cell based at least on the one or more interference impact factors, performing a radio access bearer reconfiguration based at least on the one or more interference impact factors, performing a mobility management to decide whether to initiate the soft or softer handover of the terminal in the cell to another cell based at least on the one or more interference impact factors, and performing an adaptive interference planning based at least on the one or more interference impact factors.

9. The method of claim 4, further comprising:

providing the one or more interference impact factors to a radio resource management (RRM) node over an interface, wherein for a cell i of the wireless network, the one or more interference impact factors of the cell i comprises at least one of soft impact factors $\{g_{soft,\,j(i)}\}$, softer impact factors $\{g_{softer,\,j(i)}\}$, and remaining neighbor cell interference impact factors $\{g_{remaining,\,j(i)}\}$, wherein the soft impact factors $\{g_{soft,\,j(i)}\}$ couple contributions to an interference experienced at the one or more neighbor cells due to soft handovers of terminals into or out of the cell i, wherein the softer impact factors $\{g_{softer\,j(i)}\}$ couple contributions to the interference experienced at the one or more neighbor cells due to softer handovers of the terminals into or out of the cell i, and wherein the remaining neighbor cell interference impact factors $\{g_{softer,\,j(i)}\}$ couple contributions to the interference experienced at the one or more neighbor cells, due to activities of the terminals in the cell i, not in the soft or softer handovers.

10. A method performed at a radio resource management (RRM) node of a wireless network, the method comprising:

obtaining one or more impact factors from a network node over an interface; and performing a radio resource management (RRM) function based at least on the obtained one or more impact factors, wherein the one or more impact factors represent factors that couple scheduling decisions taken in one cell with interferences experienced in one or more neighbor cells, wherein the one or more impact factors comprises at least one of soft impact factors $\{g_{soft,\,j(i)}\}$, softer impact factors $\{g_{softer,\,j(i)}\}$, and remaining neighbor cell interference impact factors $\{g_{remaining,\,j(i)}\}$, and wherein the one or more impact factors couple contributions to an interference experienced at one or more cells other than in a cell of interest due to handovers or activities of terminals into or out of the cell of interest.

11. The method of claim 10, wherein the soft impact factors $\{g_{soft,\,j(i)}\}$ couple contributions to the interference experienced at the one or more neighbor cells due to soft handovers of the terminals into or out of the cell of interest, wherein the softer impact factors $\{g_{softer,\,j(i)}\}$ couple contributions to the interference experienced at the one or more neighbor cells due to softer handovers of the terminals into or out of the cell of interest, wherein the remaining neighbor cell interference impact factors $\{g_{remaining,\,j(i)}\}$ couple contributions to the interference experienced at the one or more neighbor cells, due to activities of the terminals in the cell of interest, not in the soft or softer handovers, and wherein the step of obtaining the one or more impact factors from the network node comprises:

receiving at least one of the soft impact factors $\{g_{soft,\,j(i)}\}$, the softer impact factors $\{g_{softer,\,j(i)}\}$, and the remaining neighbor cell interference factors $\{g_{remaining,\,j(i)}\}$ of a cell i over the interface.

12. The method of claim 10, wherein the step of performing the RRM function comprises one or more of:

scheduling radio sources for a terminal in a cell based at least on the one or more impact factors, performing a power control of the terminal in the cell based at least on the one or more impact factors, performing an admission control to decide whether or not to admit the terminal in the cell based at least on the one or more impact factors, performing a congestion control to decide whether or not to remove the terminal from being connected to the cell based at least on the one or more impact factors, performing a mobility management to decide whether to initiate soft or softer handover of the terminal in the cell to another cell based at least on the one or more impact factors, and performing an adaptive interference planning based at least on the one or more impact factors.

13. A first network node corresponding to a cell of interest in a wireless network, the first network node comprising:

an interference manager structured to:

estimate a neighbor cell interference estimate $\hat{P}_{neighbor}(t)$ based on one or both of a measured load $\overline{L}_{own}(t)$ and a total wideband power $P_{RTWP}(t)$;

obtain one or more of a soft interference estimate $\hat{P}_{soft}(t)$, a softer interference estimate $\hat{P}_{softer}(t)$, remaining and a neighbor interference estimate $\hat{P}_{neighborRemaining}(t)$, based on the neighbor cell interference estimate $\hat{P}_{neighbor}(t)$;

determine, through an interference estimator, one or more interference-related quantities, the one or more interference-related quantities comprising the soft interference estimate $\hat{P}_{soft}(t)$, the softer interference estimate $\hat{P}_{softer}(t)$, the remaining neighbor interference estimate $\hat{P}_{neighborRemaining}(t)$, and the neighbor cell interference estimate $\hat{P}_{neighbor}(t)$, wherein the measured load $\overline{L}_{own}(t)$ represents resource grants used at time t by one or more cell terminals in the cell of interest and the total wideband power $P_{RTWP}(t)$ represents a total power received in the cell of interest at the time t, wherein the neighbor cell interference estimate $\hat{P}_{neighbor}(t)$ represents an estimate of a neighbor cell interference $P_{neighbor}(t)$ which expresses a sum of interferences present in the cell of interest due to wireless activities applicable at the time t in one or more cells other than in the cell of interest, wherein the soft interference estimate $\hat{P}_{soft}(t)$ represents an estimate of a soft interference $P_{soft}(t)$ which expresses a sum of interferences present in the cell of interest due to soft handovers applicable at the time t of one or more terminals into or out of the cell of interest, wherein the softer interference estimate $\hat{P}_{softer}(t)$ represents an estimate of a softer interference $P_{softer}(t)$ which expresses a sum of interferences present in the cell of interest due to softer handovers applicable at the time t of the one or more terminals into or out of the cell of interest, and wherein the remaining neighbor interference estimate $\hat{P}_{neighborRemaining}(t)$ represents an estimate of a remaining neighbor interference $P_{neighborRemaining}(t)$ which expresses a sum of interferences present in the cell of interest due to wireless activities applicable at the time t in the one or more cells other than in the cell of interest other than the soft interference $P_{soft}(t)$ and the softer interference $P_{softer}(t)$;

determine one or more interference impact factors based on the determined one or more interference-related quantities; and perform a radio resource management (RRM) function based at least on the determined one or more interference-related quantities so as to control interferences experienced in the one or more cells other than in the cell of interest.

14. The first network node of claim 13, wherein the interference manager is structured to:

obtain the soft interference estimate $\hat{P}_{soft}(t)$ based on load factors of the one or more terminals involved in the soft handovers into or out of the cell of interest, obtain the softer interference estimate $\hat{P}_{softer}(t)$ based on the load factors of the one or more terminals involved in the softer handovers into or out of the cell of interest, and obtain the remaining neighbor interference estimate $\hat{P}_{neighborRemaining}(t)$ based on the neighbor cell interference estimate $P_{neighbor}(t)$ the soft interference estimate $\hat{P}_{soft}(t)$, and the softer interference estimate $\hat{P}_{softer}(t)$.

15. The first network node of claim 13, further comprising:

a communicator structured to:
signal the determined one or more interference-related quantities to a second network node over an interface, wherein the interface used by the communicator of the first network node for the signaling comprises one or more of Iub, Iur, and Iubx interface, and signal at least one of the neighbor cell interference estimate $\hat{P}_{neighbor}(t)$, the soft interference estimate $\hat{P}_{soft}(t)$, the softer interference estimate $\hat{P}_{softer}(t)$, remaining and the neighbor interference estimate $\hat{P}_{neighborRemaining}(t)$ to the second network node over the interface.

16. A second network node in a wireless network, the second network node comprising:

a communicator structured to obtain one or more interference related quantities from one or more first network nodes;

an interference manager structured to determine one or more interference impact factors based on the obtained one or more interference-related quantities from the one or more first network nodes, wherein for each first network node, the one or more interference-related quantities comprise one or more of: a neighbor cell interference estimate $\hat{P}_{neighbor}(t)$, a soft interference estimate $\hat{P}_{soft}(t)$, a softer interference estimate $\hat{P}_{softer}(t)$, and a remaining neighbor interference estimate $\hat{P}_{neighborRemaining}(t)$, wherein for each first network node, the neighbor cell interference estimate $\hat{P}_{neighbor}(t)$ represents an estimate of a neighbor cell interference $P_{neighbor}(t)$ which expresses a sum of interferences present in a cell of interest corresponding to the first network node due to wireless activities applicable at time t in one or more cells other than in the cell of interest of the first network node, wherein for each first network node the soft interference estimate $\hat{P}_{soft}(t)$ represents an estimate of a soft interference $P_{soft}(t)$ which expresses a sum of interferences present in the cell of interest corresponding to the first network node due to soft handovers applicable at the time t of one or more terminals into or out of the cell of interest of the first network node, wherein for each first network node, the softer interference estimate $\hat{P}_{softer}(t)$ represents an estimate of a softer interference $P_{softer}(t)$ which expresses a sum of interferences present in the cell of interest corresponding to the first network node due to softer handovers applicable at the time t of the one or more terminals into or out of the cell of interest of the first network node, wherein for each first network node, the remaining neighbor interference estimate $\hat{P}_{neighborRemaining}(t)$ represents an estimate of a remaining neighbor interference $P_{neighborRemaining}(t)$ which expresses a sum of interferences, present in the cell of interest corresponding to the first network node due to the wireless activities applicable at the time t in the one or more cells other than in the cell of interest of the first network node, other than the soft interference $P_{soft}(t)$ and the softer interference $P_{softer}(t)$, and wherein the one or more interference impact factors represent factors that couple scheduling decisions taken in one cell with interferences experienced in one or more neighbor cells; and a resource manager structured to perform a radio resource management (RRM) function based at least on the one or more interference impact factors so as to control interferences experienced in the one or more cells other than in the cell of interest.

17. The second network node of claim 16, wherein for each first network node, the communicator is structured to receive at least one of the neighbor cell interference estimate $\hat{P}_{neighbor}(t)$, the soft interference estimate $\hat{P}_{soft}(t)$, the softer interference estimate $\hat{P}_{softer}(t)$, and the remaining neighbor interference estimate $\hat{P}_{neighborRemaining}(t)$ from the first network node over an interface.

18. The second network node of claim 16, wherein for at least one cell i represented in the one or more interference-related quantities, the interference manager is structured to obtain a set of impact factors $\{g_{j(i)}\}$ from a set of cells $\{j(i)\}$ neighboring the cell i based on the one or more interference-related quantities.

19. The second network node of claim 18, wherein, in order to obtain the set of impact factors $\{g_{j(i)}\}$, the interference manager is structured to obtain at least one of soft impact factors $\{g_{soft, j(i)}\}$, softer impact factors $\{g_{softer, j(i)}\}$, and remaining neighbor cell interference impact factors $\{g_{remaining, j(i)}\}$, wherein the soft impact factors $\{g_{soft, j(i)}\}$ couple contributions to an interference experienced at the cell i from the one or more neighbor cells due to soft handovers of terminals into or out of the cell i, wherein the softer impact factors $\{g_{softer, j(i)}\}$ couple contributions to the interference experienced at the cell i from the one or more neighbor cells due to softer handovers of the terminals into or out of the cell i, and wherein the remaining neighbor cell interference impact factors $\{g_{remaining, j(i)}\}$ couple contributions to the interference experienced at the cell i, from the one or more neighbor cells due to activities of the terminals in the cell i, not in the soft or softer handovers.

20. The second network node of claim 16, wherein the resource manager comprises one or more of:
   - a scheduler structured to schedule radio sources for a terminal in a cell based at least on the one or more interference impact factors,
   - a power controller structured to perform a power control of the terminal in the cell based at least on the one or more interference impact factors,
   - an admission controller structured to perform an admission control to decide whether or not to admit the terminal in the cell based at least on the one or more interference impact factors,
   - a congestion controller structured to perform a congestion control to decide whether or not to remove the terminal from being connected to the cell based at least on the one or more interference impact factors,
   - a radio access bearer manager structured to perform a radio access bearer reconfiguration based at least on the one or more interference impact factors,
   - a mobility manager structured to perform a mobility management to decide whether to initiate the soft or softer handover of the terminal in the cell to another cell based at least on the one or more interference impact factors, and
   - a cell planner structured to perform an adaptive interference planning based at least on the one or more interference impact factors.

21. The second network node of claim 16, wherein the communicator is further structured to provide the one or more interference impact factors to a radio resource management (RRM) node over an interface.

* * * * *